(12) United States Patent
Kang et al.

(10) Patent No.: US 12,380,616 B2
(45) Date of Patent: Aug. 5, 2025

(54) ELECTRONIC DEVICE AND METHOD FOR PROVIDING IMAGE TO CALENDAR APPLICATION BY ELECTRONIC DEVICE

(71) Applicant: Samsung Electronics Co., Ltd., Suwon-si (KR)

(72) Inventors: Dongkyun Kang, Suwon-si (KR); Sungchan Bae, Suwon-si (KR); Eunhae Lim, Suwon-si (KR); Yookyung Ham, Suwon-si (KR); Changhwan Kim, Suwon-si (KR); Hyeyoung Moon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 461 days.

(21) Appl. No.: 17/885,000

(22) Filed: Aug. 10, 2022

(65) Prior Publication Data

US 2022/0383571 A1    Dec. 1, 2022

Related U.S. Application Data

(63) Continuation of application No. PCT/KR2021/001521, filed on Feb. 5, 2021.

(30) Foreign Application Priority Data

Feb. 10, 2020    (KR) .................. 10-2020-0015505

(51) Int. Cl.
*G06T 11/60*    (2006.01)
*G06T 11/20*    (2006.01)

(52) U.S. Cl.
CPC ............ *G06T 11/60* (2013.01); *G06T 11/206* (2013.01)

(58) Field of Classification Search
None
See application file for complete search history.

(56) References Cited

U.S. PATENT DOCUMENTS

| 7,420,526 B2 * | 9/2008 | Morita .................... G06F 16/58 |
| | | 707/E17.026 |
| 7,774,718 B2 * | 8/2010 | Finke-Anlauff ........ G06F 16/54 |
| | | 715/833 |

(Continued)

FOREIGN PATENT DOCUMENTS

| KR | 10-2005-0047490 A | 5/2005 |
| KR | 10-2010-0119972 A | 11/2010 |

(Continued)

OTHER PUBLICATIONS

[Chuseok Report]⑤Will next year's Chuseok be the real golden holiday, Sep. 18, 2016.

(Continued)

*Primary Examiner* — Jason A Pringle-Parker
(74) *Attorney, Agent, or Firm* — Jefferson IP Law, LLP

(57) ABSTRACT

An electronic device is provided. The electronic device includes a display and a processor. The processor is configured to identify, when an image is configured at a specific date in a calendar application, a set of multiple images which include, as a default image, the configured image, determine a first image among the set of the multiple images on the basis of a calendar view selected from the calendar application, and display the determined first image in a display area of the specific date in the calendar view.

15 Claims, 32 Drawing Sheets

(56) References Cited

U.S. PATENT DOCUMENTS

| | | | |
|---|---|---|---|
| 7,865,840 B2* | 1/2011 | Matsuzawa | G06Q 10/109 715/810 |
| 8,010,579 B2* | 8/2011 | Metsatahti | G06F 16/94 707/951 |
| 8,095,406 B2* | 1/2012 | Nakamura | G06F 16/58 368/29 |
| 8,204,270 B2* | 6/2012 | Tanigawa | H04M 1/27475 379/201.04 |
| 8,375,318 B2* | 2/2013 | Masuda | G06F 16/58 715/772 |
| 8,650,472 B2* | 2/2014 | Yamaji | G06T 11/60 715/255 |
| 9,448,699 B2* | 9/2016 | Reyes | G06F 3/0482 |
| 9,459,774 B1* | 10/2016 | Ali | G06F 3/04845 |
| 10,739,934 B2* | 8/2020 | Vaskevitch | G06F 3/0481 |
| 2004/0125150 A1* | 7/2004 | Adcock | G06F 16/54 715/810 |
| 2005/0105374 A1* | 5/2005 | Finke-Anlauff | G06F 16/54 365/232 |
| 2007/0256035 A1* | 11/2007 | Matsuzawa | G06F 15/0225 715/963 |
| 2008/0046831 A1* | 2/2008 | Imai | G06F 15/025 715/765 |
| 2008/0175103 A1* | 7/2008 | Nakamura | G06Q 10/109 368/10 |
| 2009/0100332 A1* | 4/2009 | Kanjilal | G06Q 10/109 715/234 |
| 2010/0279741 A1* | 11/2010 | Park | G06Q 10/107 455/566 |
| 2011/0004835 A1* | 1/2011 | Yanchar | G06F 40/134 715/763 |
| 2011/0050549 A1* | 3/2011 | Yamada | G06F 16/51 345/55 |
| 2011/0078612 A1* | 3/2011 | Matsuzawa | G06F 15/0225 715/772 |
| 2012/0204123 A1 | 8/2012 | Bauer et al. | |
| 2013/0136412 A1* | 5/2013 | Lee | G06F 3/04817 386/230 |
| 2014/0194089 A1 | 7/2014 | Park et al. | |
| 2014/0372898 A1* | 12/2014 | Ayres | G06Q 10/1093 715/744 |
| 2015/0135088 A1* | 5/2015 | Lim | H04M 1/72451 715/745 |
| 2017/0344955 A1* | 11/2017 | Kim | G06F 3/0488 |
| 2018/0189744 A1* | 7/2018 | Frank | G06F 21/6218 |
| 2018/0365654 A1* | 12/2018 | Carver | G06V 40/172 |

FOREIGN PATENT DOCUMENTS

| | | |
|---|---|---|
| KR | 10-2013-0012033 A | 1/2013 |
| KR | 10-2013-0094598 A | 8/2013 |
| KR | 10-2013-0112954 A | 10/2013 |
| KR | 10-2014-0083681 A | 7/2014 |
| KR | 10-2015-0017184 A | 2/2015 |
| KR | 20-0479407 Y1 | 1/2016 |
| KR | 10-2016-0091780 A | 8/2016 |

OTHER PUBLICATIONS

Korean Office Action dated Oct. 10, 2024, issued in Korean Application No. 10-2020-0015505.

Korean Office Action dated Jan. 9, 2025, issued in Korean Application No. 10-2020-0015505.

* cited by examiner

ELECTRONIC DEVICE AND METHOD FOR PROVIDING IMAGE TO CALENDAR APPLICATION BY ELECTRONIC DEVICE

CROSS-REFERENCE TO RELATED APPLICATION(S)

This application is a continuation application, claiming priority under § 365(c), of an International application No. PCT/KR2021/001521, filed on Feb. 5, 2021, which is based on and claims the benefit of a Korean patent application number 10-2020-0015505, filed on Feb. 10, 2020, in the Korean Intellectual Property Office, the disclosure of which is incorporated by reference herein in its entirety.

BACKGROUND

1. Field

The disclosure relates to an electronic device capable of providing various images in a calendar application of the electronic device and a method for providing an image to the calendar application of the electronic device.

2. Description of Related Art

Electronic devices provide various applications capable of performing various functions. For example, electronic devices provide a camera application capable of performing a camera function, a call application capable of performing a call function, and a calendar application capable of managing schedule information.

The calendar application may display a schedule in an area of a specific date based on the user's schedule information input on the specific date or notify the user of the schedule at a notification time.

Further, the user may input schedule information on a specific date on the calendar application and, if selecting a sticker image to allow her to intuitively know the schedule information and setting it as a sticker image as the specific data, the sticker image along with the schedule may be displayed on the specific date.

The above information is presented as background information only to assist with an understanding of the disclosure. No determination has been made, and no assertion is made, as to whether any of the above might be applicable as prior art with regard to the disclosure.

SUMMARY

The calendar application provides a sticker image corresponding to a fixed image having a fixed size always without considering, e.g., the calendar view type of displaying the calendar application or the number of pieces of schedule information input by the user, the length of schedule information and/or detailed information about the schedule information.

Further, the calendar application provides a plurality of same sticker images without considering schedule information, causing user inconvenience by requiring that the user search and select the sticker image related to the schedule information among the plurality of images.

Aspects of the disclosure are to address at least the above-mentioned problems and/or disadvantages and to provide at least the advantages described below. Accordingly, an aspect of the disclosure is to provide an electronic device capable of providing various images in a calendar application of the electronic device considering various contexts and a method for providing an image to the calendar application of the electronic device.

Additional aspects will be set forth in part in the description which follows and, in part, will be apparent from the description, or may be learned by practice of the presented embodiments.

In accordance with an aspect of the disclosure, an electronic device is provided. The electronic device includes a display and a processor configured to, if an image is set on a specific date on a calendar application, identify a set of a plurality of images including the image as a default image, determine a first image among the set of the plurality of images based on a calendar view selected from the calendar application, and display the determined first image in a display area of the specific date in the calendar view.

In accordance with another aspect of the disclosure, a method for providing an image on a calendar application by an electronic device is provided. The method includes if an image is set on a specific date on the calendar application, identifying a set of a plurality of images including the image as a default image, determining a first image among the set of the plurality of images based on a calendar view selected from the calendar application, and displaying the determined first image in a display area of the specific date in the calendar view.

According to various embodiments, it is possible to provide variable images to the calendar application based on the calendar view type displaying the calendar application or schedule information input by the user.

According to various embodiments, by providing at least one image detected based on schedule information in the calendar application, the user may conveniently select the image corresponding to the schedule information.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 4A, 4B, 4C, 4D, and 4E are views illustrating a set of a plurality of images provided to a calendar application by an electronic device according to various embodiments of the disclosure;

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
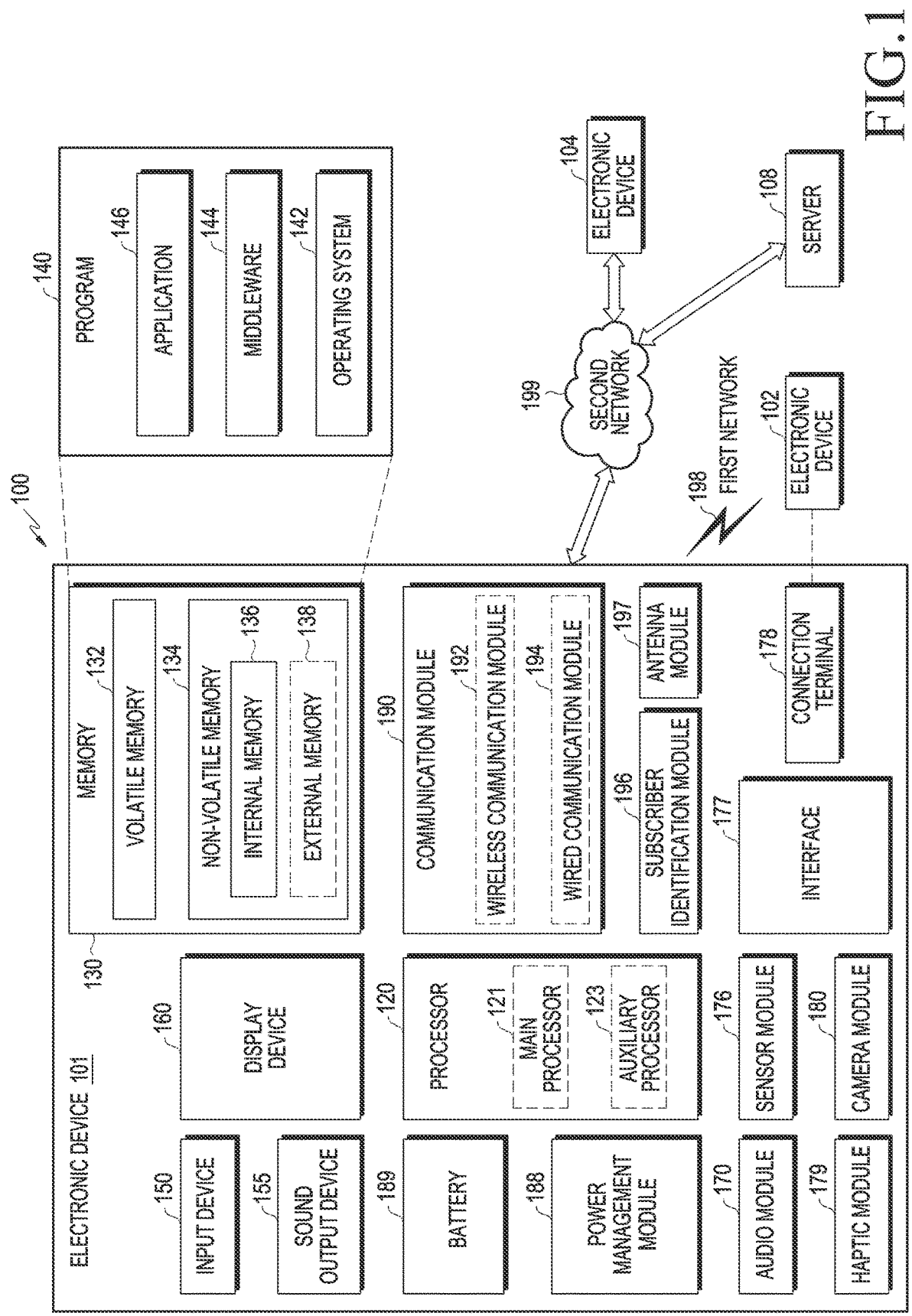
FIG. 1 is a view illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 and 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
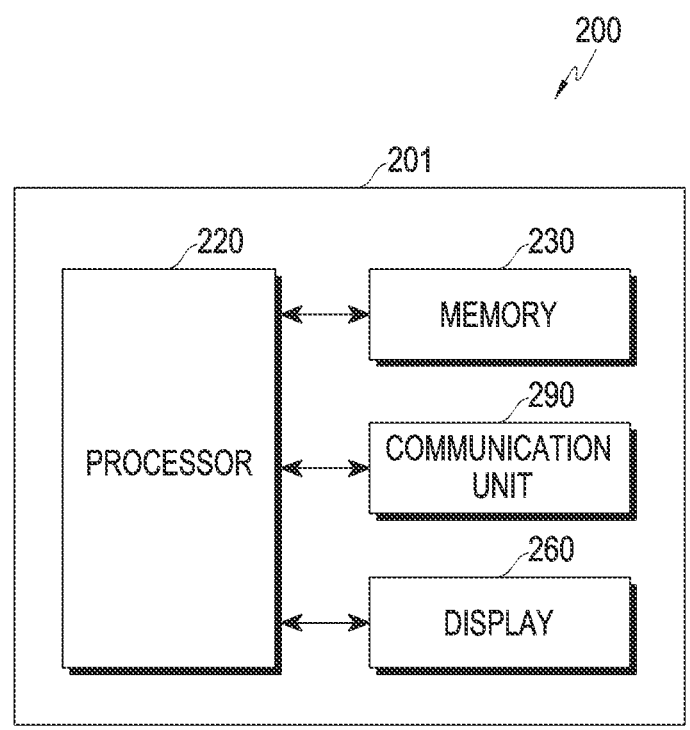
FIG. 2 is a block diagram schematically illustrating an electronic device according to an embodiment of the disclosure.

FIG. 2 is a block diagram 200 schematically illustrating an electronic device according to an embodiment of the disclosure.

Referring to FIG. 2, an electronic device 201 (e.g., the electronic device 101 of FIG. 1) may include a processor 220, a memory 230, a display 260, and a communication unit 290.

According to various embodiments, if an image is set on a specific date, the processor 220 (e.g., the processor 120 of FIG. 1) may identify a set of a plurality of images including the image as a default image and determine an image to be displayed in a display area of the specific date among the set of the plurality of images according to a calendar view type and/or display information (e.g., display information according to the number of pieces of schedule information registered and/or the length of the schedule information) about the schedule information.

According to an embodiment, each image included in the set of the plurality of images may include a different number of objects and may have a different size depending on the number of the objects included. For example, as the image includes more objects, the size of the image may increase. Each image included in the set of the plurality of images may include at least one same object.

According to an embodiment, each image among the set of the plurality of images may be predetermined corresponding to the calendar view type and/or display information (e.g., display information according to the number of pieces of schedule information registered and/or the length of the schedule information) about the schedule information. Since the size of the display area of the date differs depending on the calendar view type and/or display information about the schedule information, the corresponding image among the set of the plurality of images may be predetermined based on the size of the display area of the date.

According to an embodiment, the display area of the date may denote an area in which date-related schedule information (e.g., title) and/or the image set on the date may be displayed in the calendar view. The schedule information may be displayed in the date area based on the display information about the schedule information. The date information may be included and displayed in the display area of the date, or schedule information and/or image corresponding to the date information may be displayed separately from the date information. The display area of the date differs in size depending on the calendar type.

For example, when the set of the plurality of images includes a first image (default image) including a first object, a second image including the first object and a second object, a third image including the first object, the second object, and a third object, and a fourth image including the first object, the second object, the third object, and a fourth object, in order of image size, the processor may display the first image in the display area of a specific date in a first calendar view for displaying in month view among the calendar view types. Further, the processor may display the second image in the display area of the specific date in the second calendar view for displaying in week view, which has a larger display area than the display area of the date of the first calendar view among the calendar view types. Further, the processor may display the third image in the display area of the specific date in the third calendar view for displaying in day view, which has a larger display area than the display area of the date of the second calendar view among the calendar view types. Further, the processor may display the fourth image in the fourth calendar view for displaying detailed information about the specific date, which has a larger display area than the display area of the date of the third calendar view.

According to an embodiment, the processor may provide an edit function to allow the set of the plurality of images to be edited, e.g., added or deleted, by the user.

According to various embodiments, if the same image is set for a plurality of dates on the calendar application, the processor 220 (e.g., the processor 120 of FIG. 1) may identify a set of a plurality of images including the image as a default image and determine an image to be displayed in a plurality of display areas among the set of the plurality of images based on the plurality of display areas corresponding to the plurality of dates.

According to an embodiment, if the same schedule information and/or the same image is set for the plurality of dates on the calendar application, the processor may identify the sizes of the plurality of display areas corresponding to the plurality of dates and determine the image corresponding to the sizes of the plurality of display areas among the set of the plurality of images. The processor may display the determined image, as one image, in the plurality of display areas corresponding to the plurality of dates in the calendar view of the calendar application.

According to an embodiment, each image included in the set of the plurality of images may be predetermined depending on the sizes of the plurality of display areas, and each image included in the set of the plurality of images may differ in image size based on the number of objects included therein.

According to an embodiment, when schedule information (e.g., title) is displayed in the plurality of display areas corresponding to the plurality of dates in the calendar view of the calendar application, the processor may adjust the size of the determined image to be displayed in the plurality of display areas or change the position of display of the image to be displayed in the plurality of display areas.

According to various embodiments, when an image is set on a specific date on the calendar application, and the image set on the specific date is displayed in the calendar view, the processor 220 (e.g., the processor 120 of FIG. 1) may display the image in the display area of the specific date based on an image display change condition.

According to an embodiment, the image display change condition may include at least one of whether schedule information is registered, the number of pieces of schedule information, and/or length of schedule information. According to an embodiment, if no schedule information is registered on the specific date based on whether schedule information is registered among image display change conditions, the processor may display the image, without resizing, in the center of the display area of the specific date in the calendar view.

According to an embodiment, the processor may identify the number of pieces of schedule information registered on the specific date based on the number of pieces of schedule information among the image display change conditions and, according to the number of pieces of schedule information displayed in the display area of the specific date in the calendar view, adjust the size of the image, change the position of the image, or change the image to another image (e.g., default image) among the set of the plurality of images including the image and display it.

According to an embodiment, the processor may identify time information (e.g., time information from the start time to the end time) included in the schedule information registered on the specific date based on the length of schedule information among the image display change conditions and change the size of the image or the position of the image according to the display of the time information included in the schedule information. The processor may display the length of the schedule information, as at least one time period area corresponding to the time information included in the schedule information among a plurality of time period areas included in the display area of the specific date. The processor may display the at least one time period area among the plurality of time period areas included in the display area of the specific date to be distinguished from the other time period areas while adjusting the size of the image and/or changing the position of the image based on the size and/or length of the at least one time period area displayed and displaying it in the display area of the specific date.

According to an embodiment, the processor may display the at least one time period area, indicating the length of the schedule information registered on the specific date, in a different size and/or length according to the calendar view type (e.g., the second calendar view for displaying in week view or the third calendar for displaying in day view).

According to various embodiments, when an image is set on a specific date on the calendar application, and the image set on the specific date is displayed in the calendar view, the processor 220 (e.g., the processor 120 of FIG. 1) may change at least one object among at least one object included in the image into another object based on an image object change condition and display the object-changed image in the display area of the specific date.

According to an embodiment, at least one object included in the image set on the specific date may include at least one object that may be changed based on the image object change condition.

According to an embodiment, the image object change condition may include at least one of a time change in schedule information and/or an environment change at the time of notifying of schedule information.

According to an embodiment, the processor may detect schedule information from the start time of the schedule information to the end time among the schedule information registered on the specific date based on the time change in the schedule information among image object change conditions. The processor may change at least one object among at least one object included in the image into another object, corresponding to the time change from the start time of the schedule information to the end time of the schedule information and display it. For example, when the image set on the specific date includes an object representing a cup filled with juice, the processor may replace the object with each object indicating a reduction in the amount of the juice in the cup from the start time of the schedule information to the end time of the schedule information and display the image.

According to an embodiment, the processor may detect at least one of the weather information, place information, and/or time information at the time of outputting the schedule information based on the environment change at the time of notifying of the schedule information among the image object change conditions. The processor may change at least one object among at least one object included in the image into another object based on the weather information at the time of outputting the schedule information and display it. For example, in a case where the image set on the specific date includes a first object representing the background of a clear day, a second object representing a table, and a third object representing a cup filled with juice, upon detecting that it's raining based on the weather information at the time of outputting the schedule information, the processor may display an image in which the first object has been replaced with a rainy background. The processor may change at least one object among at least one object included in the image into another object based on the place information at the time of outputting the schedule information and display it. For example, when the image set on the specific date includes a first object representing a background representing a first place and a second object including an airplane, upon detecting that the electronic device is located in the second place based on the changed place information of the electronic device at the time of outputting the schedule information, the processor may display an image in which the first object has been changed into the background corresponding to the second place. The processor may change at least one object among at least one object included in the image into another object based on the time information at the time of outputting the schedule information and display it. For example, in a case where the image set on the specific date includes a first object representing the daytime background of a clear day, a second object representing a table, and a third object representing a cup filled with juice, upon detecting that it's currently the night time based on the time information at the time of outputting the schedule information, the processor may display an image in which the first object has been replaced with a night background.

According to various embodiments, when an image is set on a specific date on the calendar application, and the image set on the specific date is displayed in the calendar view, the processor 220 (e.g., the processor 120 of FIG. 1) may display an image in which at least one object among the at least one object included in the image has been changed or an object has been added based on the schedule information registered on the specific date, in the display area of the specific date.

According to an embodiment, the processor may add at least one object to the image based on the schedule information (e.g., detailed information) registered on the specific date. For example, when the image set on the specific date includes a first object representing an airplane, the processor may add a second object representing a logo of A company to the image including the first object representing the airplane, based on the detailed information indicating that "A is boarding an airplane" in the schedule information and display it in the display area of the specific date.

According to various embodiments, if a plurality of pieces of schedule information are registered on the specific date on the calendar application, the processor 220 (e.g., the processor 120 of FIG. 1) may display one image obtained by combining the plurality of images respectively set for the plurality of pieces of schedule information based on the relevance between the plurality of pieces of schedule information, in the display area of the specific date.

According to an embodiment, if first schedule information and second schedule information are registered on the specific date, and a first image is set for the first schedule information, and a second image is set for the second schedule information, the processor may detect whether the first schedule information and the second schedule information are related. When the first schedule information and the second schedule information are identical and/or similar to each other in place information, time information, and at least one text included in the title/detailed description, the processor may determine that the first schedule information and the second schedule information are related and generate an image resultant from combining at least one object among the at least one object included in the first image and at least one object among the at least one object included in the second image. The processor may display the generated image, as a single image, in the display area of the specific date.

According to an embodiment, the processor may combine the at least two images set respectively for the at least two pieces of schedule information based on the relevance between the at least two pieces of schedule information according to the calendar view type and display the combined image, as a single image, in the display area of the specific date. For example, upon determining that one combined image of the at least two images may be displayed in the display area of the date in the fourth calendar view for displaying the detailed information on the specific date, the processor may display one combined image of the at least two images in the display area of the date in the fourth calendar view. Upon determining that one combined image of the at least two images may not be displayed in the display area of the date in the first calendar view for displaying in month view, the processor may display at least one image of the first image or the second image in the display area of the date in the second calendar view.

According to various embodiments, if schedule information is input on the specific date on the calendar application, the processor 220 (e.g., the processor 120 of FIG. 1) may provide at least one image corresponding to the schedule information among the plurality of images, as a recommendation image.

According to an embodiment, the processor may provide, in a popup window, at least one recommendation image among the plurality of images, based on at least one of the title, time information, location information, memo information, and detailed information included in the schedule information.

According to various embodiments, if schedule information is input on the specific date on the calendar application, the processor 220 (e.g., the processor 120 of FIG. 1) may automatically set one image corresponding to the schedule information among the plurality of images, as the image of the specific date.

According to various embodiments, when the electronic device 201 is located in a specific place, the processor 220 (e.g., the processor 120 of FIG. 1) may receive information related to the specific place from a specific application, set the image including the object corresponding to the received information among the plurality of images, as the image of the current date displayed in the calendar view of the calendar application, and display it in the display area of the current date.

For example, when the electronic device is currently in a cafe, upon receiving information about the beverage bought in the cafe before from a credit card application, the processor may display the image including the object corresponding to the beverage information in the display area of the current date.

According to an embodiment, when an image is preset on the current date on the calendar application, the processor may add the object corresponding to the received information to the image set on the current date or change one of at least one object included in the image set on the current date into the object corresponding to the received information, based on the relevance between the current location information about the electronic device and the schedule information set on the current date.

For example, in the case of receiving, from the credit card application, information about a second beverage bought before in the cafe where the electronic device is currently located, in a state in which an image including at least one object including a first object representing a first beverage is set on the current date on the calendar application, if the cafe where the electronic device is currently located is identical to the place information of the schedule information registered on the current date, the processor may change the object representing the first beverage included in the image into the second object representing the second beverage.

According to various embodiments, if schedule information is registered on the specific date on the calendar application, the processor 220 (e.g., the processor 120 of FIG. 1) may detect target information from the text information of the schedule information and display the image including at least one object corresponding to the target information in the display area of the specific date.

According to an embodiment, upon detecting the target information and name information, thing information, or place information based on the text information input to the title, memo, and detailed information view of the schedule information registered on the specific date, the processor may display the image including the object corresponding to the target information in the display area of the specific date.

For example, if text information indicating that "meet friend A at 3 PM' is input to the title of the schedule information, the processor may detect "friend A" as the target information, detect the image corresponding to "friend A" from the memory of the electronic device, and display the image in the display area of the specific date. The processor may detect a photo image related to "friend A" on the gallery application or AR emoji of "friend A" and display it in the display area of the specific date.

According to various embodiments, the memory 230 (e.g., the memory 130 of FIG. 1) may store a plurality of images, and each of the plurality of images includes and stores a set of a plurality of images including the default image.

According to various embodiments, the display 360 (e.g., the display device 160 of FIG. 1) may change the image designated on the date and display it in the display area of the date according to the calendar view type on the calendar application.

According to various embodiments, the communication unit 390 (e.g., the communication module of FIG. 1) may transmit at least one image among the plurality of images stored in the memory 230 to an external electronic device or transmit calendar information about the calendar application, including at least one set image and/or at least one piece of registered schedule information to the external electronic device.

According to various embodiments, an electronic device (e.g., the electronic device 101 of FIG. 1 and/or the electronic device 201 of FIG. 2) may comprise a display (e.g., the display device 160 of FIG. 1 and/or the display 260 of FIG. 2) and a processor (e.g., the processor 120 of FIG. 1 and/or the processor 220 of FIG. 2) configured to, if an image is set on a specific date on a calendar application, identify a set of a plurality of images including the image as a default image, and determine a first image among the set of the plurality of images based on a calendar view selected from the calendar application and display the determined first image in a display area of the specific date in the calendar view.

According to various embodiments, the processor may be configured to determine the first image among the set of the plurality of images, based on a size of the display area of the specific date in the calendar view.

According to various embodiments, the processor may be configured to determine the first image among the set of the plurality of images, based on based on display information about schedule information to be displayed in the display area of the specific date in the calendar view.

According to various embodiments, the processor may be configured to, if the image is set on a plurality of dates on the calendar application, determine the first image among the set of the plurality of images based on a size of a plurality of display areas corresponding to the plurality of dates and display the determined image, as one image, in the plurality of areas.

According to various embodiments, the processor may be configured to change a position and/or size of the first image based on an image display change condition and display the first image in the display area of the specific date.

According to various embodiments, the image display change condition may include at least one of whether schedule information is registered, a number of pieces of registered schedule information, and/or a length of schedule information.

According to various embodiments, the processor may be configured to change at least one object among at least one object included in the first image into another object based on an image object change condition and display the first image in the area of the specific date.

According to various embodiments, the image object change condition may include at least one of a time change in schedule information and/or an environment change at a time of notifying of schedule information.

According to various embodiments, the processor may be configured to change at least one object or add an object to the first image, based on schedule information registered on the specific date.

According to various embodiments, the processor may be configured to, if a plurality of pieces of schedule information are registered on the specific date, display, in the area of the specific date, one image obtained by combining a plurality of images respectively set for the plurality of pieces of schedule information, based on a relevance between the plurality of pieces of schedule information.

According to various embodiments, the processor may be configured to determine at least one image among a plurality of images based on schedule information on the specific date on the calendar application and provide the at least one determined image as a recommendation image.

Figure 3:
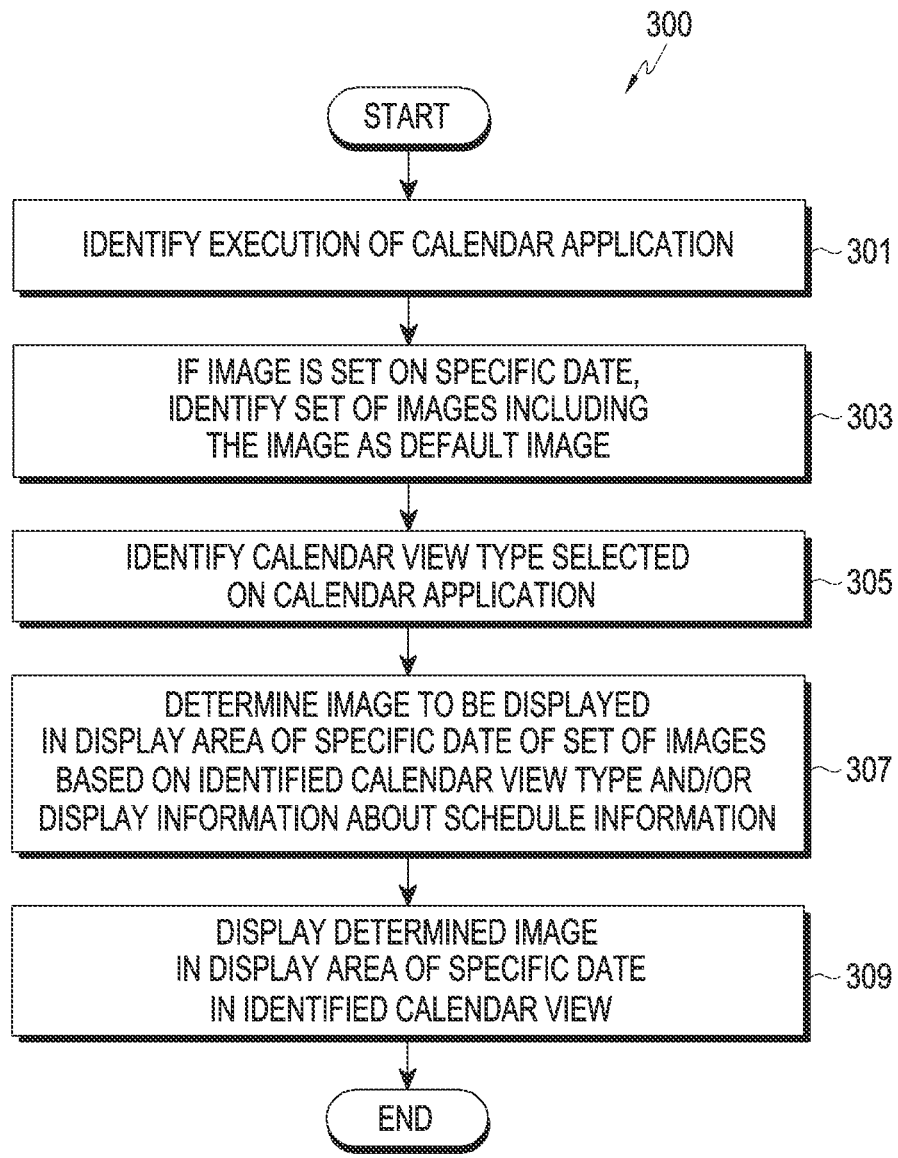
FIG. 3 is a flowchart illustrating an example operation of providing an image to a calendar application by an electronic device according to an embodiment of the disclosure.

FIG. 3 is a flowchart 300 illustrating an example operation of providing an image to a calendar application by an electronic device according to an embodiment of the disclosure. The operations of providing an image may include operations 301 to 309. The operations of providing an image may be performed by an electronic device (e.g., the electronic device 101 of FIG. 1, at least one processor (e.g., the processor 120 of FIG. 1) of the electronic device, the electronic device 201 of FIG. 2, or the processor (e.g., the processor 220 of FIG. 2) of the electronic device). According to an embodiment, at least one of operations 301 to 309 may be omitted or changed in order or may add other operations.

Referring to FIG. 3, in operation 301, the electronic device may identify that a calendar application is running.

In operation 303, if an image is set on a specific date on the calendar application, the electronic device may identify a set of a plurality of images including the image as a default image.

According to an embodiment, while displaying at least one date in the calendar view on the calendar application, the electronic device may display an input window for inputting schedule information on the specific date by the user's selection, select one image from among the plurality of images provided on the input window, and set it as the image of the specific date.

According to an embodiment, if an image is set on the specific date, the electronic device may identify a set of a plurality of images including the image as a default image. Each image included in the set of the plurality of images may have a different number of objects and may have a different image size based on the number of objects.

According to an embodiment, each image included in the set of the plurality of images may include at least one same object and include the same object included in the default image, as a default object.

In operation 305, the electronic device may identify the calendar view type selected on the calendar application.

According to an embodiment, the calendar view types may include a first calendar view for displaying in month view, a second calendar view for displaying in week view having a larger display area than the display area of the date of the first calendar view, a third calendar view for displaying in day view having a larger display area than the display area of the date of the second calendar view, and a fourth calendar view for displaying detailed information on the specific date having a larger display area than the display area of the date of the third calendar view.

In operation 307, the electronic device may determine an image to be displayed in the display area of the specific date among the set of the plurality of images based on the identified calendar view type and/or display information about the schedule information.

According to an embodiment, the electronic device may determine an image from the set of the plurality of images based on the size of the display area of the date displayed according to the calendar view type.

According to an embodiment, the electronic device may determine the calendar view type and determine an image from the set of the plurality of images based on the display information (e.g., display information according to the number of pieces of schedule information registered and/or the length of the schedule information) about the schedule information to be displayed in the display area of the specific date in the calendar view.

According to an embodiment, the electronic device may preset each image included in the set of the plurality of images, corresponding to the calendar view type and/or display information about the schedule information.

According to an embodiment, the electronic device may determine an image similar in size to the display area of the date displayed in the identified calendar view among the set of the plurality of images and adjust the determined image according to the size of the display area of the date displayed in the identified calendar view.

According to an embodiment, the electronic device may preset each image included in the set of the plurality of images, corresponding to the calendar view type.

According to an embodiment, if the identified calendar view type is the first calendar view for displaying in month view, the electronic device may determine the first image (default image) that includes only the first object (default object) among the set of the plurality of images and has the smallest image size.

According to an embodiment, if the identified calendar view type is the second calendar view for displaying in week view, the electronic device may determine the second image that includes the first object and the second object and has a larger size than the first image.

According to an embodiment, if the identified calendar view type is the third calendar view for displaying in day view, the electronic device may determine the third image that includes the first object, the second object, and the third object among the set of the plurality of images and has a larger size than the second image.

According to an embodiment, if the identified calendar view type is the fourth calendar view for displaying detailed information on the specific date, the electronic device may determine the fourth image that includes the first object, the second object, the third object, and the fourth object among the set of the plurality of images and has a larger size than the third image.

In operation 309, the electronic device may display the determined image in the display area of the specific date in the calendar view.

According to an embodiment, if the identified calendar view type is the first calendar view for displaying in month view, the electronic device may display the first image (default image) that includes only the first object (default object) among the set of the plurality of images and has the smallest image size, in the display area of the specific date displayed in the first calendar view.

According to an embodiment, if the identified calendar view type is the second calendar view for displaying in week view, the electronic device may display the second image that includes the first object and the second object and has a larger size than the first image, in the display area of the specific date displayed in the second calendar view.

According to an embodiment, if the identified calendar view type is the third calendar view for displaying in day view, the electronic device may display the third image that includes the first object, the second object, and the third object among the set of the plurality of images and has a larger size than the second image, in the display area of the specific date displayed in the third calendar view.

According to an embodiment, if the identified calendar view type is the fourth calendar view for displaying detailed information on the specific date, the electronic device may display the fourth image that includes the first object, the second object, the third object, and the fourth object among the set of the plurality of images and has a larger size than the third image, in the display area of the specific date displayed in the fourth calendar view.

FIGS. 4A to 4E are views 400a to 400e illustrating a set of a plurality of images provided to a calendar application by an electronic device according to various embodiments of the disclosure.

Figure 4A:
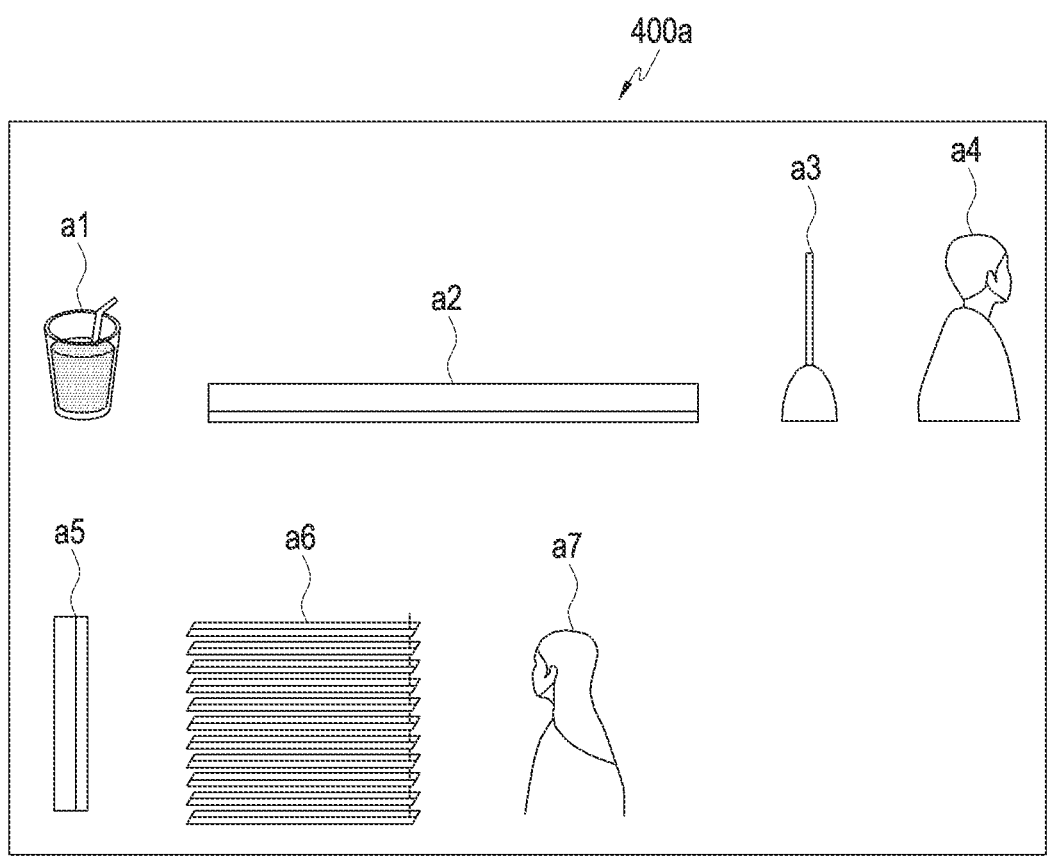

Referring to FIG. 4A, an image set on a specific date may be configured of a set of a plurality of images including a default image, and a plurality of objects a1 to a7 which may be included in each image included in the set of the plurality of images are shown.

FIGS. 4B to 4E illustrate a set of a plurality of images having different numbers of at least one objects among the plurality of objects of FIG. 4A.

Figure 4E:
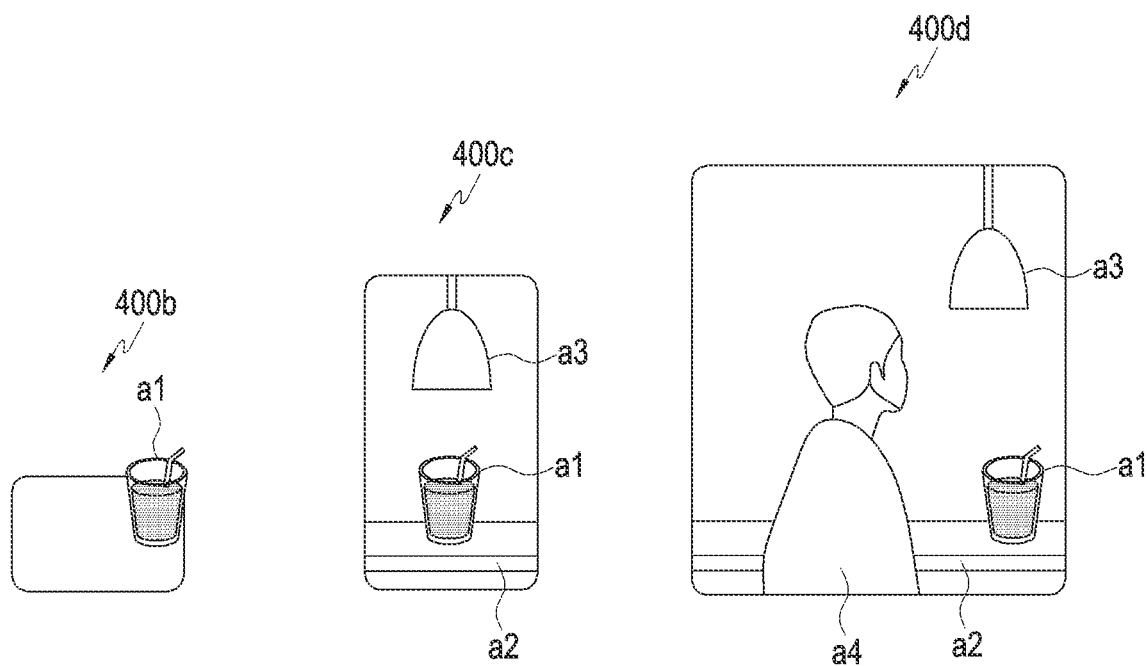
Figure 4E:
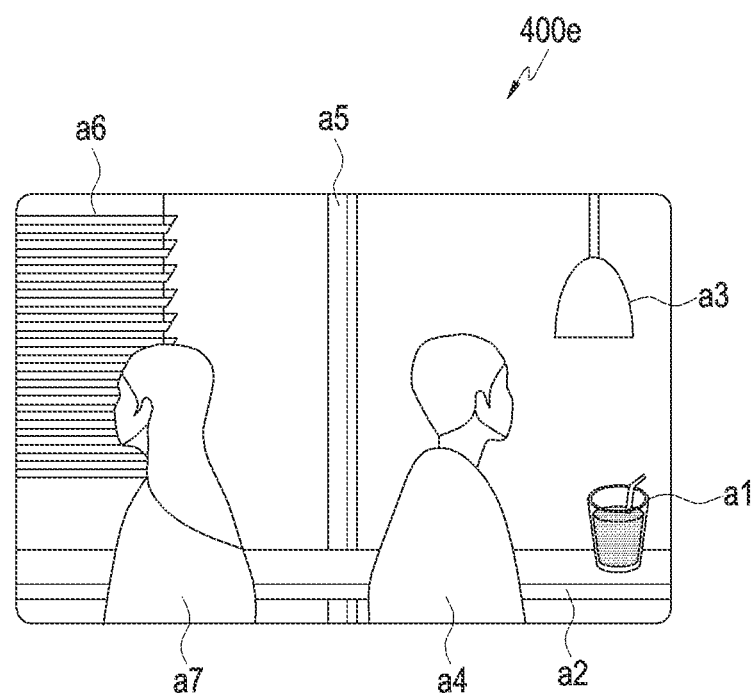

FIG. 4B illustrates a first image including the first object a1, which is the default image, among the plurality of objects of FIG. 4A, FIG. 4C illustrates a second image including the first object to the third object a1 to a3 and being larger than the first image, FIG. 4D illustrates a third image including the first object to the fourth object a1 to a4 and being larger than the second image, and FIG. 4E illustrates a fourth image including the first object to seventh object a1 to a7 and being larger than the third image.

For example, the first image of FIG. 4B may be displayed in the display area of the specific date of the first calendar view for displaying in month view, the second image of FIG. 4C may be displayed in the display area of the specific date of the second calendar view for displaying in week view, the third image of FIG. 4D may be displayed in the display area of the specific date of the third calendar view for displaying in day view, and the fourth image of FIG. 4E may be displayed in the display area of the specific date of the fourth calendar view for displaying detailed information on the specific date.

Figure 5:
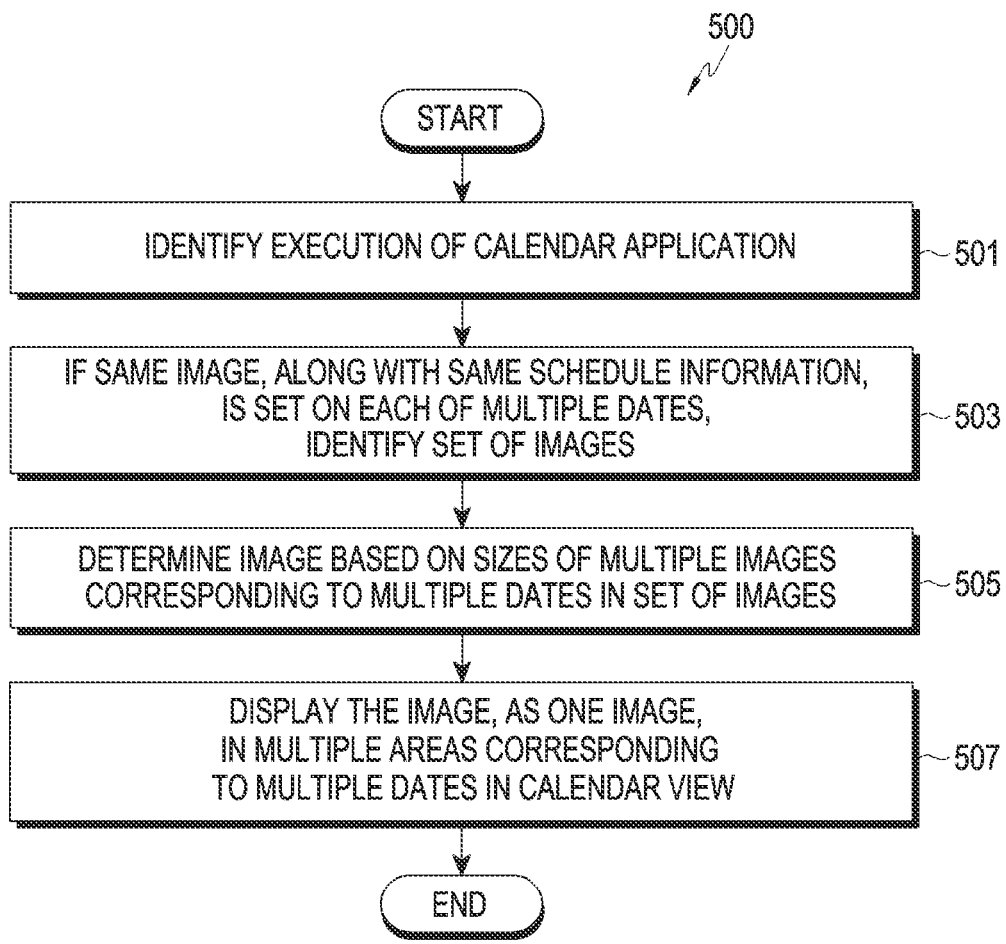
FIG. 5 is a flowchart illustrating an example operation of providing an image to a calendar application by an electronic device according to an embodiment of the disclosure.

FIG. 5 is a flowchart 500 illustrating an example operation of providing an image to a calendar application by an electronic device according to an embodiment of the disclosure. The operations of providing an image may include operations 501 to 505. The operations of providing an image may be performed by an electronic device (e.g., the electronic device 101 of FIG. 1, at least one processor (e.g., the processor 120 of FIG. 1) of the electronic device, the electronic device 201 of FIG. 2, or the processor (e.g., the processor 220 of FIG. 2) of the electronic device). According to an embodiment, at least one of operations 501 to 505 may be omitted or changed in order or may add other operations.

Referring to FIG. 5, in operation 501, the electronic device may identify that a calendar application is running.

In operation 503, if the same image, along with the same schedule information, is set on each of the plurality of dates on the calendar application, the electronic device may identify a set of a plurality of images including the same image as a default image.

According to an embodiment, if the same schedule information and/or the same image is set on the plurality of dates, the electronic device may identify the set of the plurality of images including the same as the default image.

In operation 505, the electronic device may determine one image among the set of the plurality of images based on the sizes of the plurality of display areas corresponding to the plurality of dates of the set of the plurality of images.

In operation 507, the electronic device may display the image determined from the set of the plurality of images, as one image, in the plurality of display areas corresponding to the plurality of dates displayed in the calendar view.

According to an embodiment, when the schedule information is together displayed in the plurality of display areas corresponding to the plurality of dates, the determine image may be resized and repositioned and be displayed.

Figures 6A, 6B:
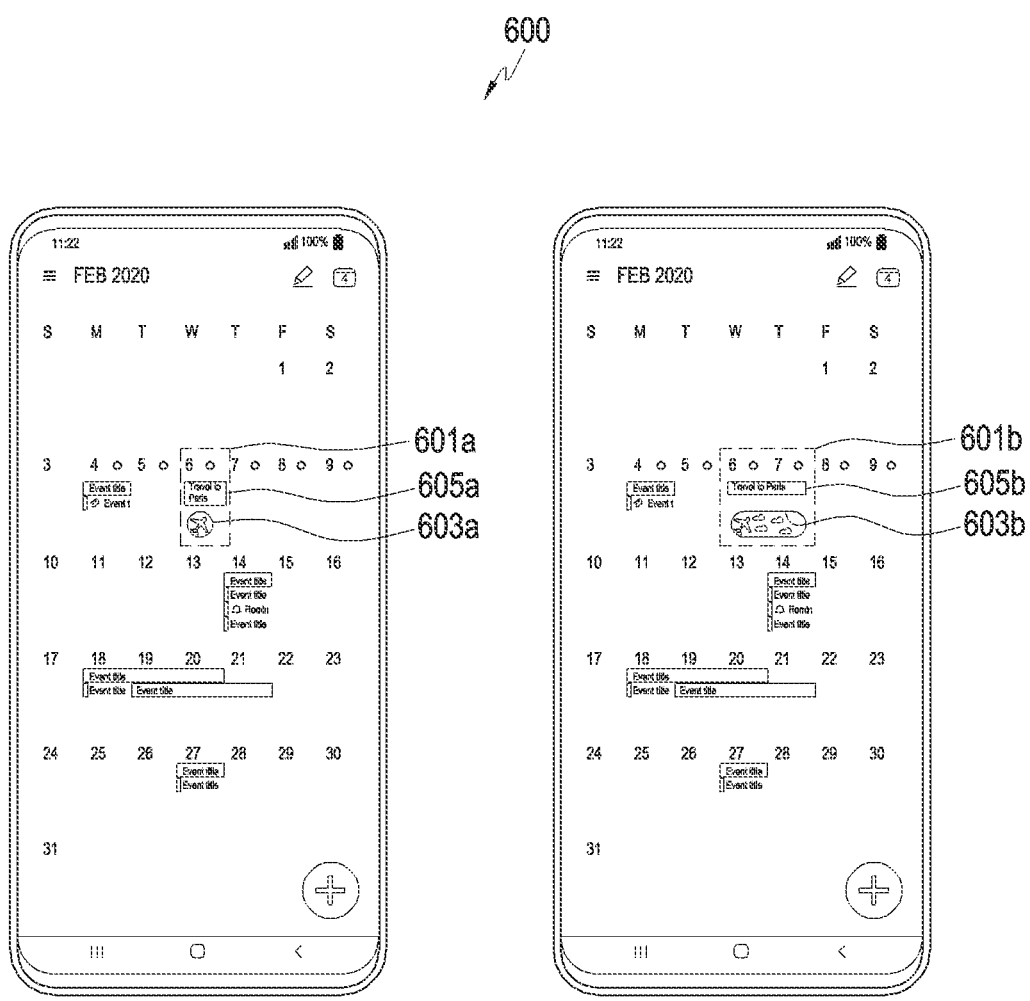
FIGS. 6A and 6B are views illustrating an operation of setting an image of a set of a plurality of images provided to a calendar application by an electronic device according to various embodiments of the disclosure.

FIGS. 6A and 6B are views illustrating an operation of setting an image of a set of a plurality of images provided to a calendar application by an electronic device according to an embodiment of the disclosure.

Referring to FIGS. 6A and 6B, when an image is set on one specific date on the calendar application as shown in FIG. 6A, the first image 603a, which is the default image including the first object representing an airplane, which is the default object, among the set of the plurality of images including the image set on the specific date as the default image, in the display area 601a of the specific date (February 6) in the first calendar view for displaying in month view among the calendar view types.

As shown in FIG. 6A, when schedule information 605a is together displayed in the display area 601a of the specific date (February 6), the first image 603a may be repositioned and resized and be displayed.

When the same image is set on a plurality of dates on the calendar application as shown in FIG. 6B, the second image 603b including the first object representing an airplane, which is the default object, and the second object representing clouds, representing a plurality of clouds, among the set of the plurality of images including the same image set on the plurality of dates as the default image, in the plurality of display areas 601b corresponding to the plurality of dates (February 6 to February 7) in the first calendar view for displaying in month view among the calendar view types.

As shown in FIG. 6B, when schedule information 605b is together displayed in the plurality of display areas 601b corresponding to the plurality of dates (February 6-February 7), the second image 603b may be repositioned and resized and be displayed.

Figure 7:
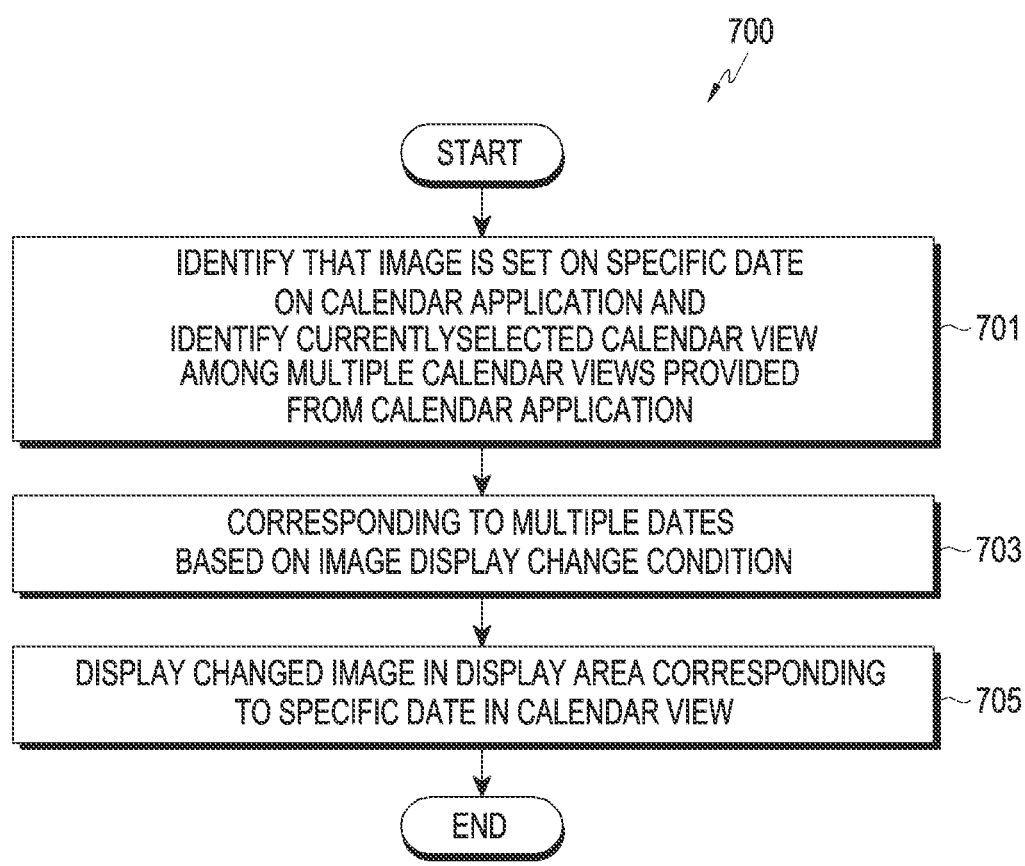
FIG. 7 is a flowchart illustrating an example operation of providing an image to a calendar application by an electronic device according to an embodiment of the disclosure.

FIG. 7 is a flowchart 700 illustrating an example operation of providing an image to a calendar application by an electronic device according to an embodiment of the disclosure. The operations of providing an image may include operations 701 to 705. The operations of providing an image may be performed by an electronic device (e.g., the electronic device 101 of FIG. 1, at least one processor (e.g., the processor 120 of FIG. 1) of the electronic device, the electronic device 201 of FIG. 2, or the processor (e.g., the processor 220 of FIG. 2) of the electronic device). According to an embodiment, at least one of operations 701 to 705 may be omitted or changed in order or may add other operations.

Referring to FIG. 7, in operation 701, the electronic device may identify that an image is set on a specific date on the calendar application and identify the calendar view currently selected calendar view among a plurality calendar views provided from the calendar application.

According to an embodiment, the electronic device may preset one calendar view among the plurality of calendar views provided from the calendar application, as a default calendar view (e.g., the first calendar view for displaying in month view).

According to an embodiment, the electronic device may display the calendar view selected by the user's selection from among the plurality of calendar views provided from the calendar application, as the current calendar view.

In operation 703, the electronic device may change the position and/or size of the image to be displayed in the display area of the specific date in the calendar view, based on the image display change condition.

According to an embodiment, the image display change condition may include at least one of whether schedule information is registered, the number of pieces of schedule information, and/or length of schedule information corresponding to the time information included in the schedule information.

According to an embodiment, the electronic device may adjust the size of the image to be displayed in the display area of the specific date in the calendar view based on at least one of whether schedule information is registered, the number of pieces of schedule information, and/or length of schedule information included in the image display change condition.

According to an embodiment, the electronic device may change the position and/or size of the image determined according to the calendar view type among the set of the plurality of images including the image to be displayed in the display area of the specific date, based on the image display change condition or change the image into another image (e.g., the default image) among the set of the plurality of images including the image and display it.

In operation 705, the electronic device may display the image resized and/or repositioned based on the image display change condition in the display area of the specific date in the calendar view.

FIGS. 8A to 8E are views 800a to 800e illustrating an operation of providing an image of a set of a plurality of images provided to a calendar application, based on a display change condition of image, by an electronic device according to various embodiments of the disclosure.

Figure 8A:
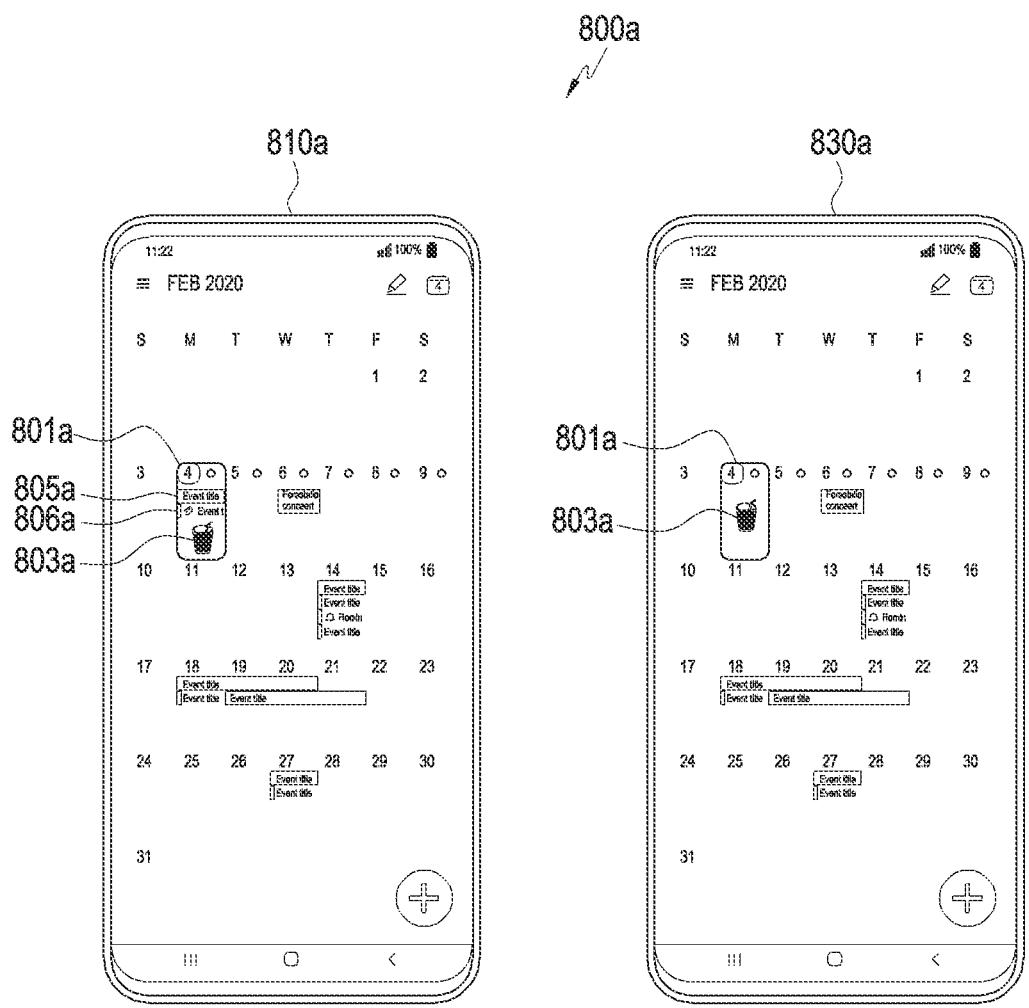
FIGS. 8A, 8B, 8C, 8D, and 8E are views illustrating an operation of providing an image of a set of a plurality of images provided to a calendar application, based on a display change condition of image, by an electronic device according to various embodiments of the disclosure.

FIG. 8A illustrates a view 800a of an operation of displaying an image in a display area of a specific date according to whether a schedule is registered and/or the number of pieces of schedule information, in the first calendar view for displaying in month view among the calendar view types according to an embodiment of the disclosure.

Referring to the screen 810a of FIG. 8A, when two pieces of schedule information are registered on the specific date, February 4, the electronic device may display a first image 803a, moved to a position where the two pieces of schedule information 805a and 806a do not overlap, in the display area 801a of the specific date.

As shown in the screen 830a of FIG. 8A, when no schedule information is registered on the specific date, February 4, the electronic device may display the first image 803a to be positioned in the center of the display area 801a of the specific date.

Figure 8B:
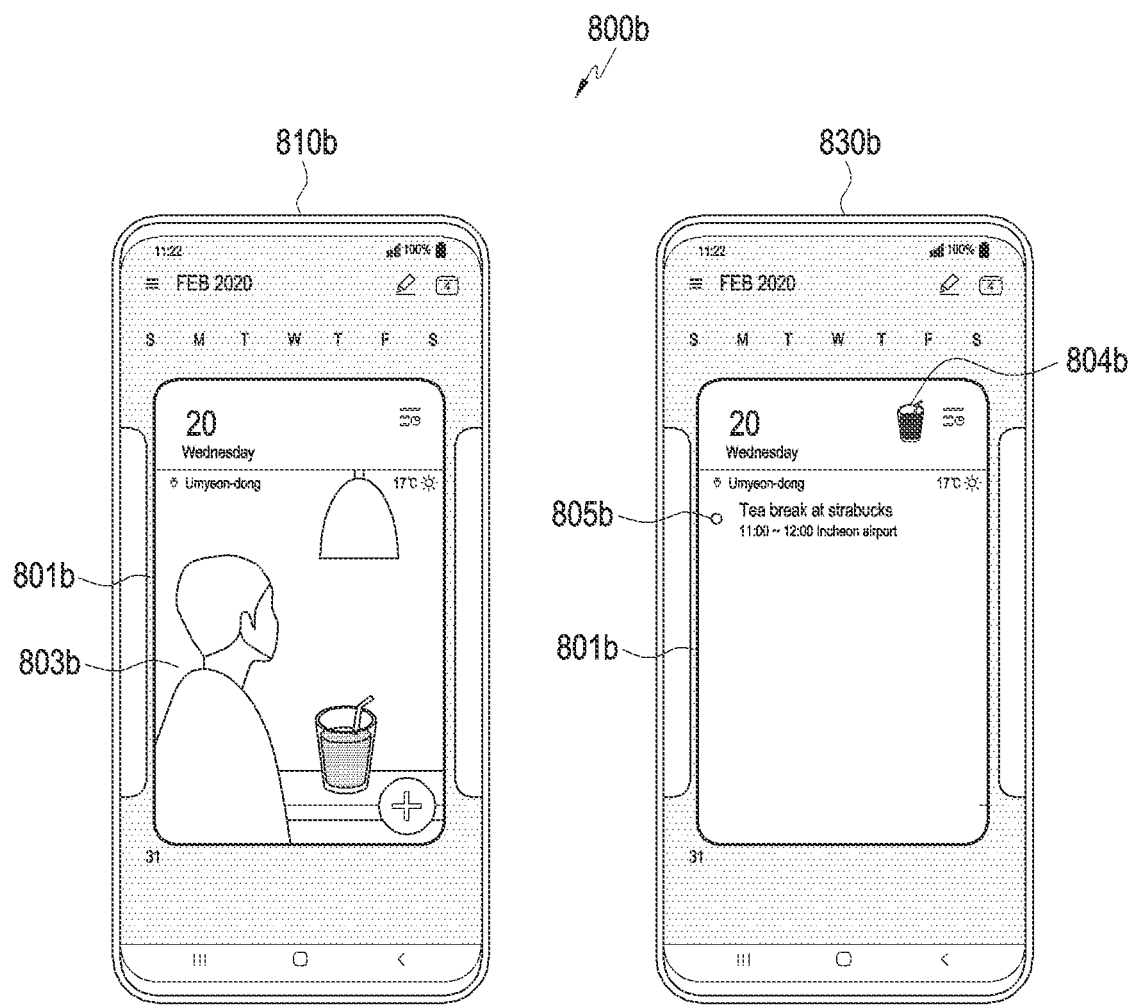

FIG. 8B illustrates the operation 800b of displaying an image in a display area of a specific date according to whether a schedule is registered and/or the number of pieces of schedule information, in the fourth calendar view for displaying detailed information on the specific date among the calendar view types.

Referring to the screen 810b of FIG. 8B, when no schedule information is registered on the specific date, February 20, the electronic device may display a third image 803b determined as the image of the fourth calendar view among the set of the plurality of images including the image set on the specific date, in the display area 801b of the specific date. As shown in the screen 830b of FIG. 8B, when one piece of schedule information 805b is registered on the specific date, February 20, the electronic device may display the first image 804b corresponding to the default image among the set of the plurality of images including the third image, in the position where the registered schedule information 805 does not overlap in the display area 801b of the specific date.

Figure 8C:
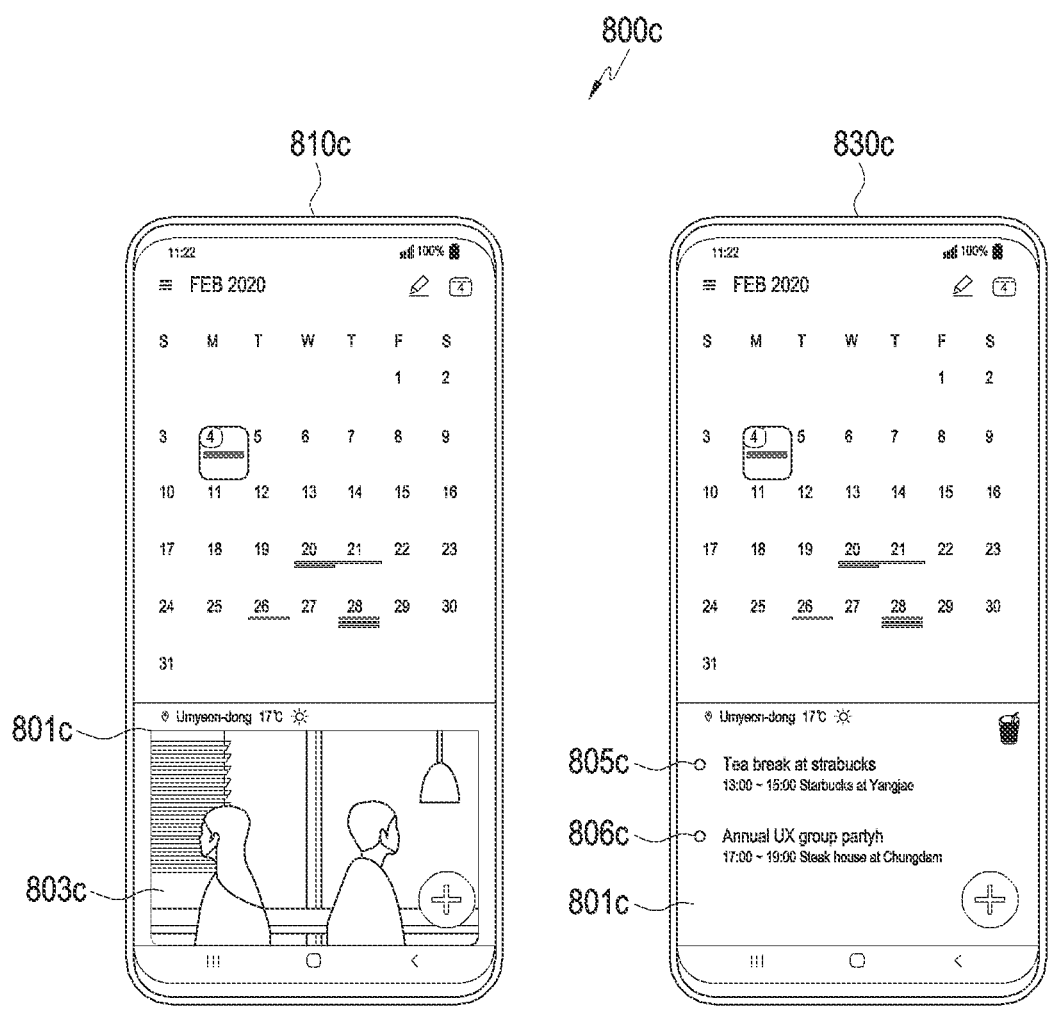

FIG. 8C illustrates the operation 800c of displaying an image in a display area of a specific date according to whether a schedule is registered and/or the number of pieces of schedule information, in the fourth calendar view for displaying detailed information on the specific date, selected in the first calendar view for displaying in month view among the calendar view types.

Referring to screen 810c of FIG. 8C, when no schedule information is registered on the specific date, February 4, the electronic device may display a third image 803c determined as the image of the fourth calendar view among the set of the plurality of images including the image set on the specific date, in the display area 801c of the specific date. As shown in the screen 830c of FIG. 8C, when two pieces of schedule information 805c and 806c are registered on the specific date, February 4, the electronic device may display the first image 804c corresponding to the default image among the set of the plurality of images including the third image, in the position where the two registered pieces of schedule information 805c and 806c do not overlap in the display area 801c of the specific date.

Figure 8D:
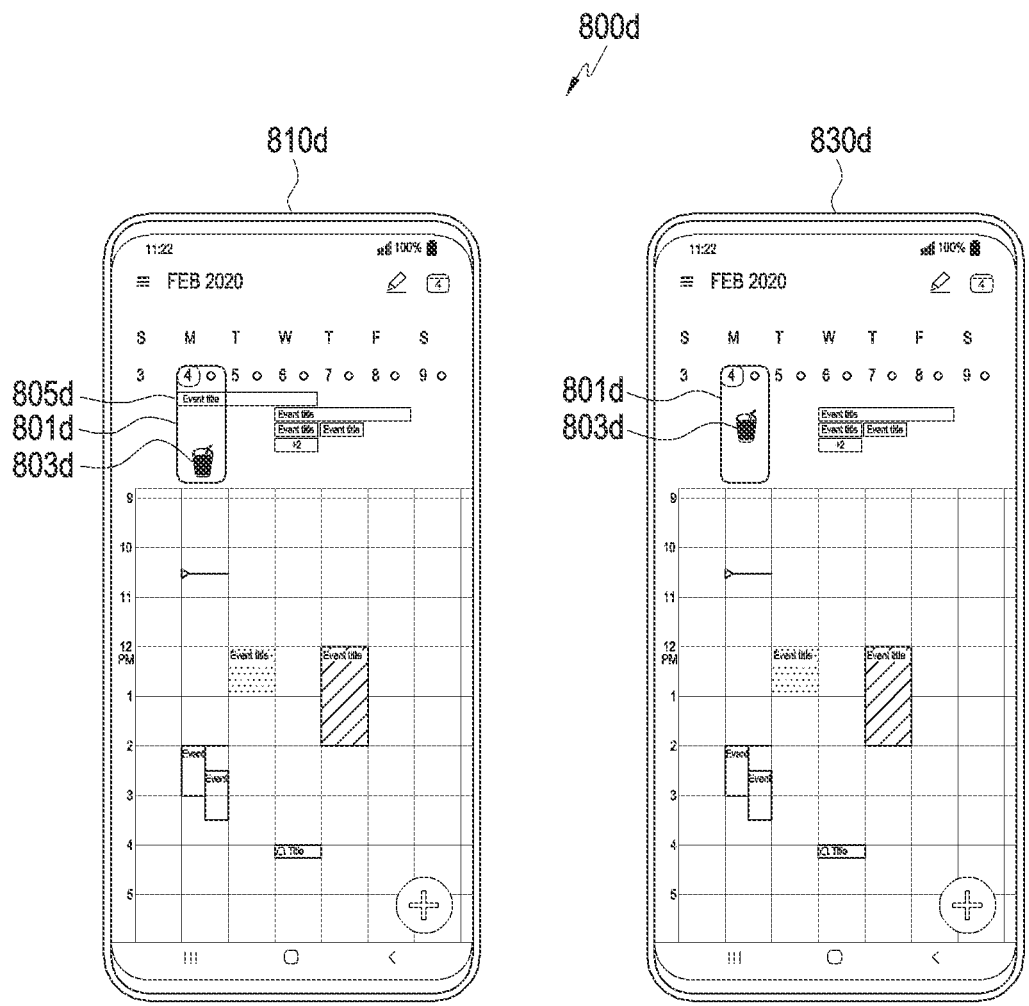

FIG. 8D illustrates the operation 800d of displaying an image in a display area of a specific date according to whether a schedule is registered and/or the number of pieces of schedule information, in the second calendar view for displaying in week view among the calendar view types.

Referring to the screen 810d of FIG. 8D, when one piece of schedule information is registered on the specific date, February 4, the electronic device may display the first image 803d, moved to a position where the schedule information 805d does not overlap, in the display area 801d of the specific date. As shown in the screen 830d of FIG. 8D, when no schedule information is registered on the specific date, February 4, the electronic device may display the first image 803d to be positioned in the center of the display area 801d of the specific date.

Figure 8E:
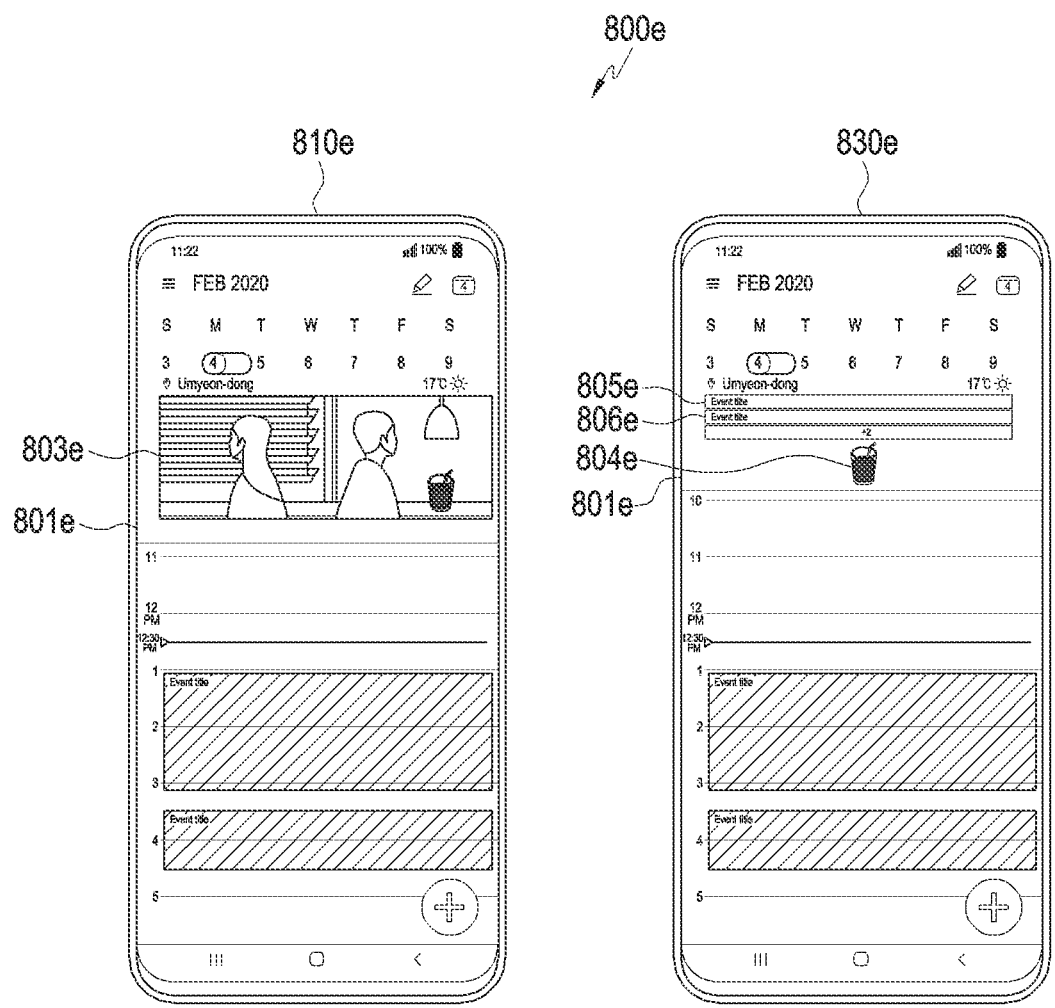

FIG. 8E illustrates the operation 800e of displaying an image in a display area of a specific date according to whether a schedule is registered and/or the number of pieces of schedule information, in the third calendar view for displaying in day view among the calendar view types.

Referring to screen 810e of FIG. 8E, when no schedule information is registered on the specific date, February 3, the electronic device may display a fourth image 803e determined as the image of the third calendar view among the set of the plurality of images including the image set on the specific date, in the display area 801e of the specific date. As shown in the screen 830e of FIG. 8E, when two pieces of schedule information 805e and 806e are registered on the specific date, February 4, the electronic device may display the first image 804e corresponding to the default image among the set of the plurality of images including the fourth image, in the position where the two registered pieces of schedule information 805e and 806e do not overlap in the display area 801e of the specific date.

Figure 9A:
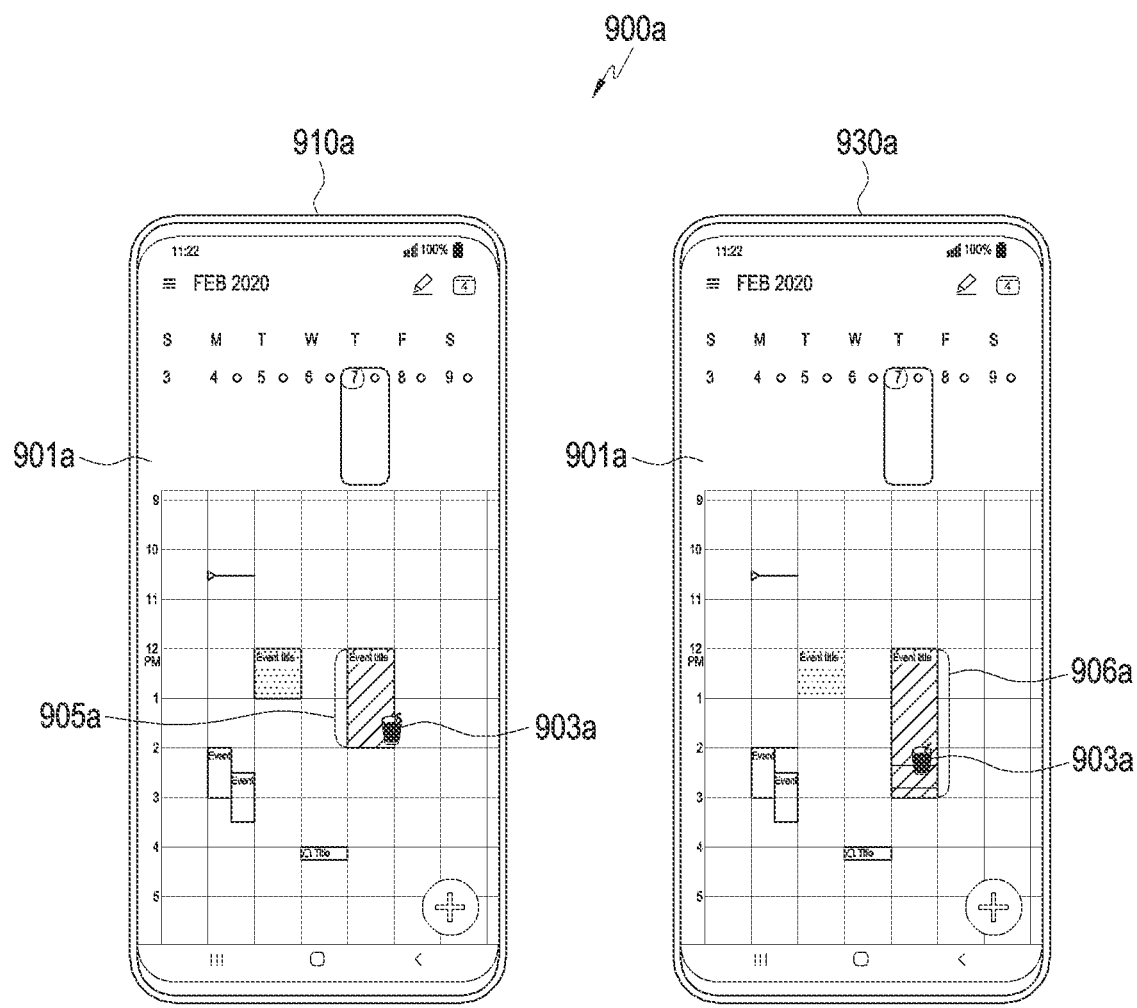
FIGS. 9A and 9B are views illustrating an operation of providing an image of a set of a plurality of images provided to a calendar application, based on a display change condition of image, by an electronic device according to various embodiments of the disclosure.
Figure 9B:
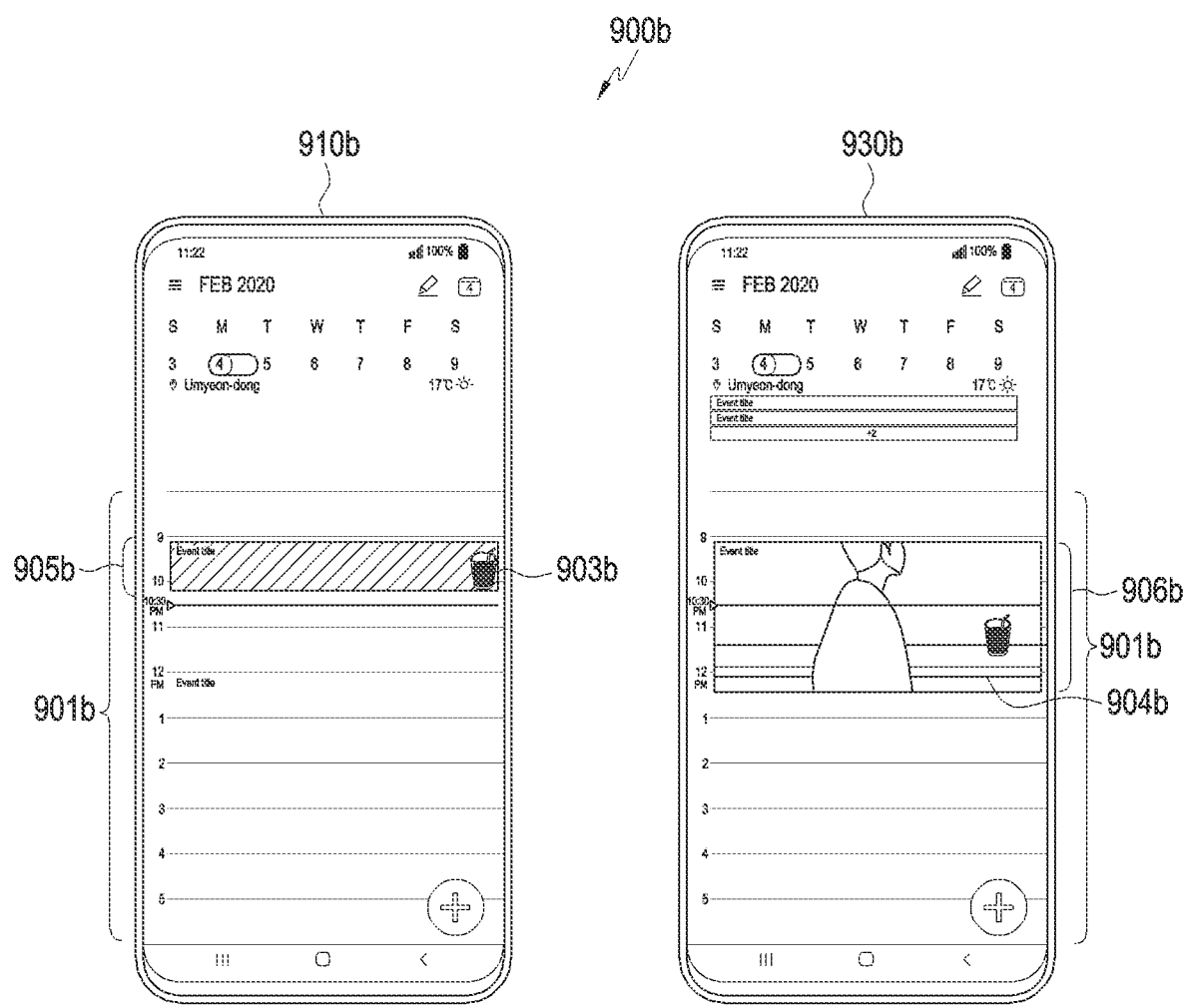

FIGS. 9A and 9B are views 900a and 900b illustrating an operation of providing an image of a set of a plurality of images provided to a calendar application, based on a display change condition of image, by an electronic device according to various embodiments of the disclosure.

FIG. 9A illustrates a view 900a of an operation of displaying an image in a display area of a specific date according to the length of schedule information in the second calendar view for displaying in week view among the calendar view types.

Referring to the screen 910a of FIG. 9A, in the second calendar view for displaying in week view among the calendar view types, the display area corresponding to each day may be divided into a plurality of time period areas and displayed. If the time information included in the schedule information registered on the specific date (February 7) is 12 PM (the notification output start time of the schedule information) to 1 PM (the notification end time of the schedule information), the electronic device may display the first image 903a set on the specific date, in a first position, in the first time period area 905a corresponding to the time information among the plurality of time period areas included in the display area 901a of the specific date. As shown in the screen 930a of FIG. 9A, if the time information included in the schedule information registered on the specific date (February 7) is 12 PM (the notification output start time of the schedule information) to 2 PM (the notification end time of the schedule information), the electronic device may display the first image 903a set on the specific date, in a second position different from the first position, in the second time period area 906a corresponding to the time information among the plurality of time period areas included in the display area 901a of the specific date.

FIG. 9B illustrates the screen 910b corresponding to of displaying an image in a display area of a specific date according to the length of schedule information in the third calendar view for displaying in day view among the calendar view types.

Referring to the screen 910b of FIG. 9B, in the third calendar view for displaying in day view among the calendar view types, the display area 901b of the specific date selected from among the dates of the week may be divided into a plurality of time period areas and displayed. If the time information included in the schedule information registered on the specific date (February 4) is 9 AM (the notification output start time of the schedule information) to 10 o'clock (the notification end time of the schedule information), the electronic device may display the first image 903*b* set on the specific date, in the first position, in the first time period area 905*b* corresponding to the time information among the plurality of time period areas included in the display area 901*b* of the specific date. As shown in the screen 930*b* of FIG. 9B, if the time information included in the schedule information registered on the specific date (February 4) is 9 AM (the notification output start time of the schedule information) to 12 PM (the notification end time of the schedule information), the electronic device may replace the first image set on the specific date with the third image 904*b* and display it in the second time period area 906*b* corresponding to the time information among the plurality of time period areas included in the display area 901*b* of the specific date. The third image 904*b* may be an image determined based on the size of the second time period area 906*b* among the set of the plurality of images including the first image.

Figure 10:
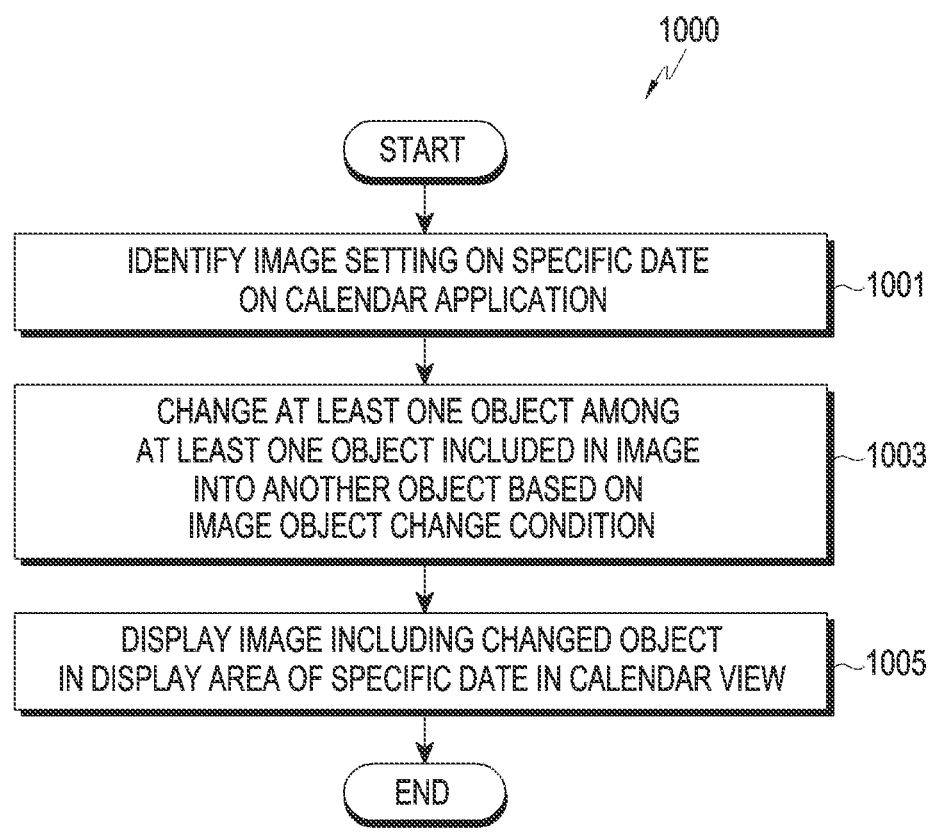
FIG. 10 is a flowchart illustrating an example operation of providing an image to a calendar application by an electronic device according to an embodiment of the disclosure.

FIG. 10 is a flowchart 1000 illustrating an example operation of providing an image to a calendar application by an electronic device according to an embodiment of the disclosure. The operations of providing an image may include operations 1001 to 1005. The operations of providing an image may be performed by an electronic device (e.g., the electronic device 101 of FIG. 1, at least one processor (e.g., the processor 120 of FIG. 1) of the electronic device, the electronic device 201 of FIG. 2, or the processor (e.g., the processor 220 of FIG. 2) of the electronic device). According to an embodiment, at least one of operations 1001 to 1005 may be omitted or changed in order or may add other operations.

Referring to FIG. 10, in operation 1001, the electronic device may identify that an image is set on a specific date on the calendar application.

In operation 1003, the electronic device may change at least one object among at least one object included in the image into another object based on the image object change condition.

According to an embodiment, at least one object among the at least one object included in the image set on the specific date may be changed based on the image object change condition.

According to an embodiment, the image object change condition may include at least one of a time change in schedule information and/or an environment change at the time of notifying of schedule information.

According to an embodiment, the electronic device may change at least one object among the at least one object included in the image into another object based on at least one of a time change in schedule information and/or an environment change at the time of notifying of schedule information among the image object change conditions.

In operation 1005, the electronic device may display the image including the changed object in the display area of the specific date in the calendar view of the calendar application.

FIGS. 11A to 11D are views 1100*a*, 1100*b*, 1100*c*, and 1100*d*, respectively, illustrating an operation of providing an image of a set of a plurality of images provided to a calendar application, based on an object change condition of image, by an electronic device according to various embodiments of the disclosure.

Figure 11A:
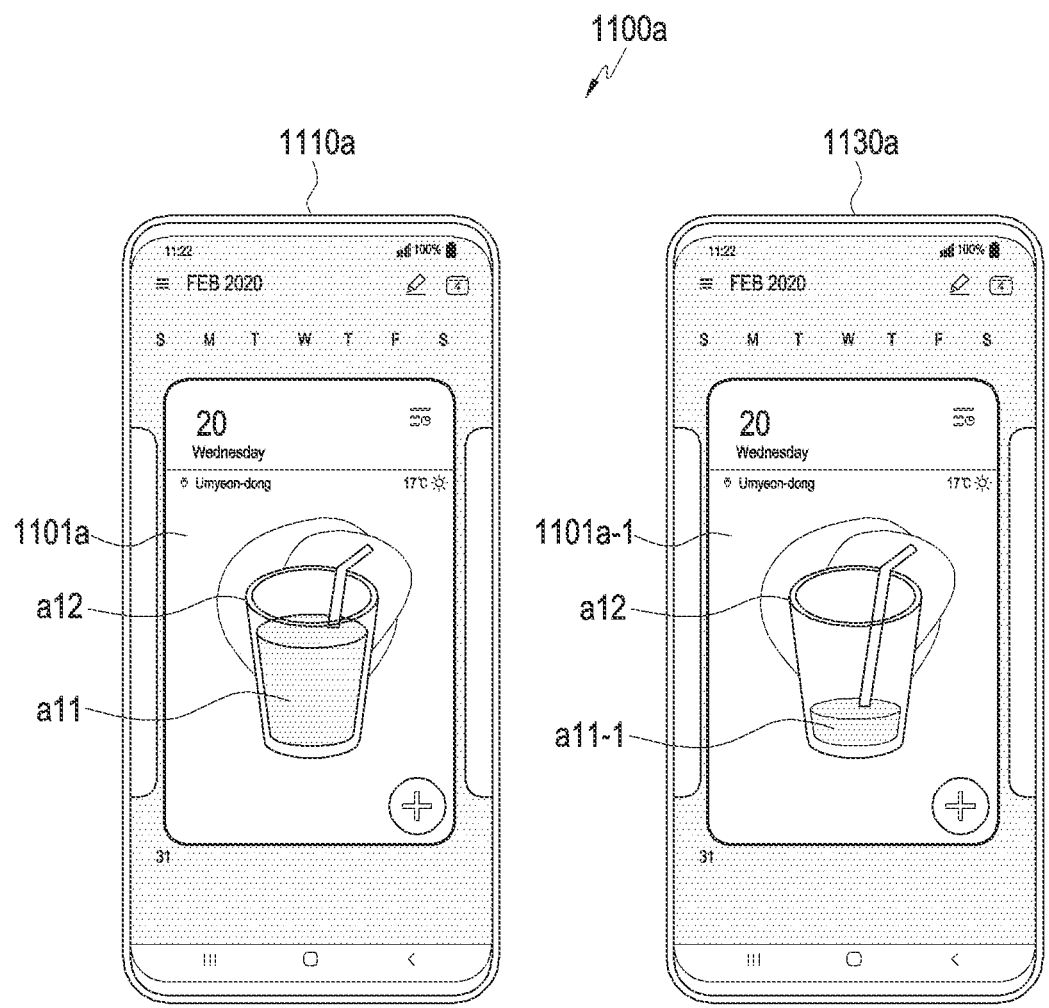
FIGS. 11A, 11B, 11C, and 11D are views illustrating an operation of providing an image of a set of a plurality of images provided to a calendar application, based on an object change condition of image, by an electronic device according to various embodiments of the disclosure.

Referring to the screen 1110*a* of FIG. 11A, in a case where an image is set on a specific date (February 20), e.g., when the current time is 9 AM which is the start time of schedule information when displaying the image set on the specific date (February 20) in the fourth calendar view for displaying detailed information on the specific date, the electronic device may display the image 1101*a* including the first object a11 representing a cup filled with juice and the second object a12 representing the background.

Referring to the screen 1130*a* of FIG. 11A, e.g., when the time elapses so that the current time is LOAM which is the end time of the schedule information when displaying the image set on the specific date (February 20) in the fourth calendar view for displaying detailed information on the specific date, the electronic device may display an image 1101*a*-1 in which the first object a11 representing the cup filled with juice of the first object a11 and the second object a12 included in the image 1101*a* has been changed into another first object a11-1 representing a cup filled with little juice, according to the time change among the image object change conditions.

Figure 11B:
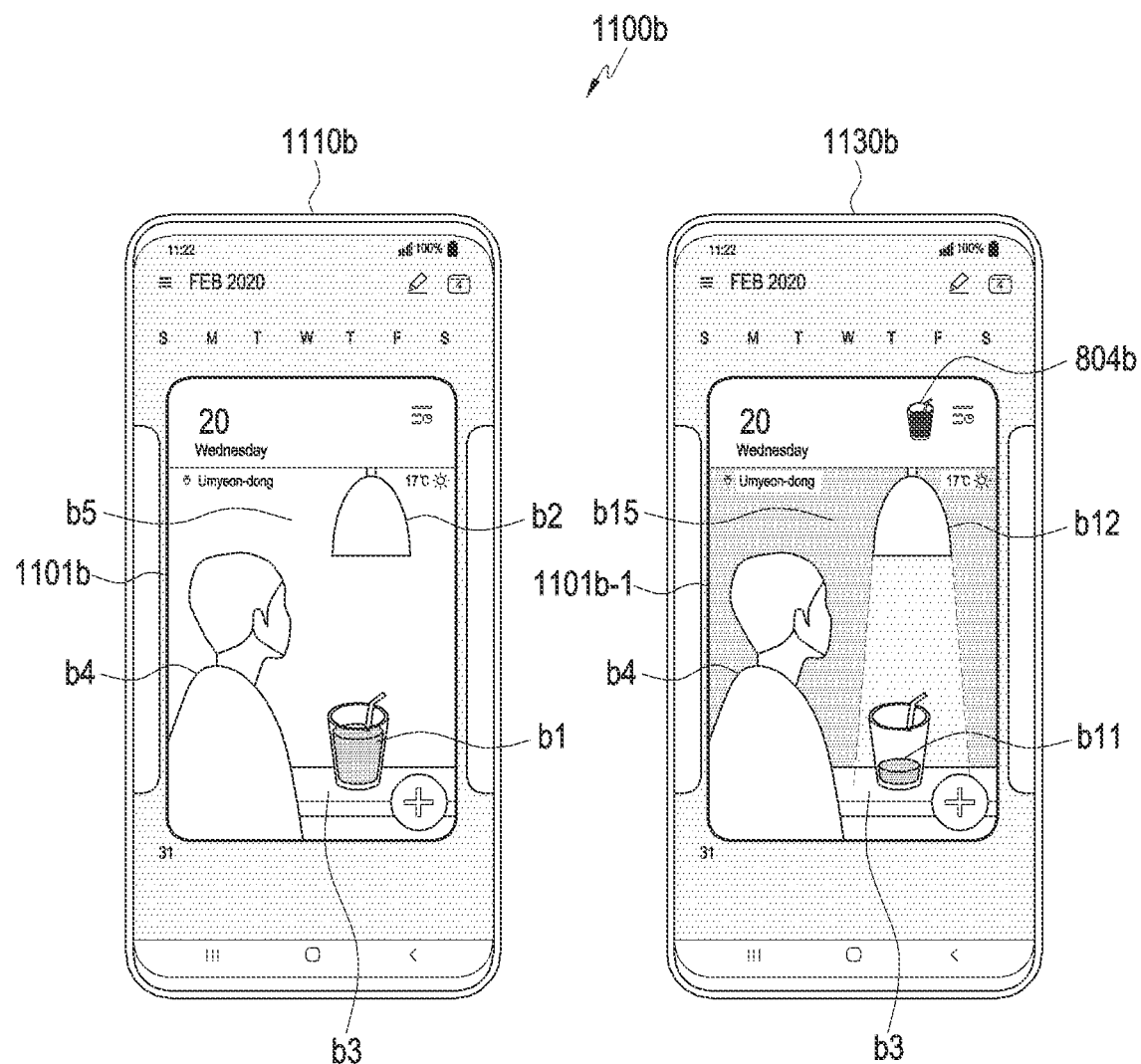

Referring to the screen 1110*b* of FIG. 11B, in a case where an image is set on a specific date (February 20), e.g., when the current time is LOAM which is the start time of schedule information when displaying the image set on the specific date (February 20) in the fourth calendar view for displaying detailed information on the specific date, the electronic device may display an image 1101*a* including the first object b1 to fifth object b5. As shown in the screen 1130*b* of FIG. 11B, e.g., when the time elapses so that the current time is 8 PM which is the end time of the schedule information when displaying the image set on the specific date (February 20) in the fourth calendar view for displaying detailed information on the specific date, the electronic device may display the image 110*b*-1 in which the first object b1 representing the cup filled with juice among the first object b1 to the fifth object b5 included in the image 1101*b*-1 has been changed into another first object b11 representing a cup filled with little juice, according to the time change among the image object change conditions, the second object b2 representing a turned-off light has been changed into another second object b12 representing a turned-on light, and the fifth object b5 representing a daytime background has been changed into another fifth object b15 representing a night background.

Figure 11C:
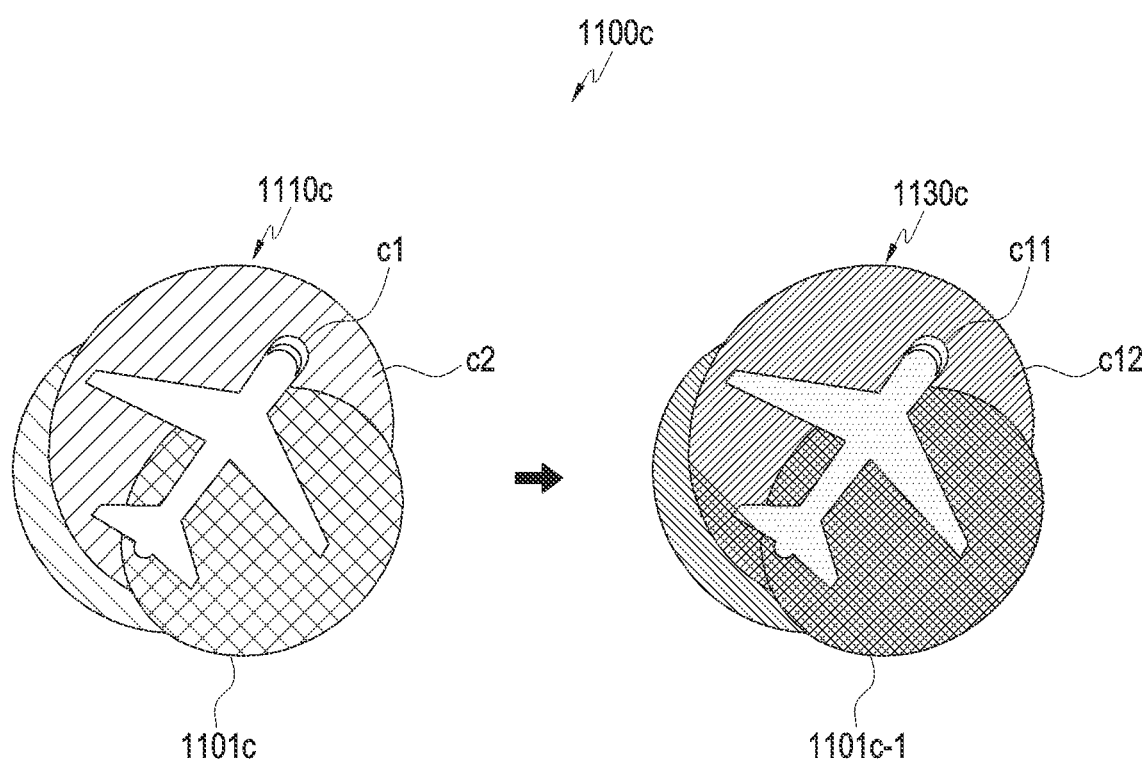

Referring to the screen 1110*c* of FIG. 11C, in a case where an image is set on a specific date, e.g., when the current time is 10 AM which is the flight departure time and the electronic device is located in the first place according to the place information when displaying the image set on the specific date in the calendar view for displaying detailed information on the specific date, the electronic device may display an image 1101*c* including the first object c1 representing the airplane and the second object c2 representing the background. As shown in the screen 1130*c* of FIG. 11C, e.g., when the time elapses so that the current time is 9 PM which is the flight arrival time and the electronic device is located in the second place according to the place information when displaying the image set on the specific date in the calendar view for displaying detailed information on the specific date, the electronic device may display a changed image 1101*c*-1 including another first object c11 and another second object c12, respectively, into which the first object c1 and the second object c2 have been changed in color according to the environment change at the time of notifying of schedule information among the image object change conditions, of the first object c1 and the second object c2 included in the image 1101*b*.

Figure 11D:
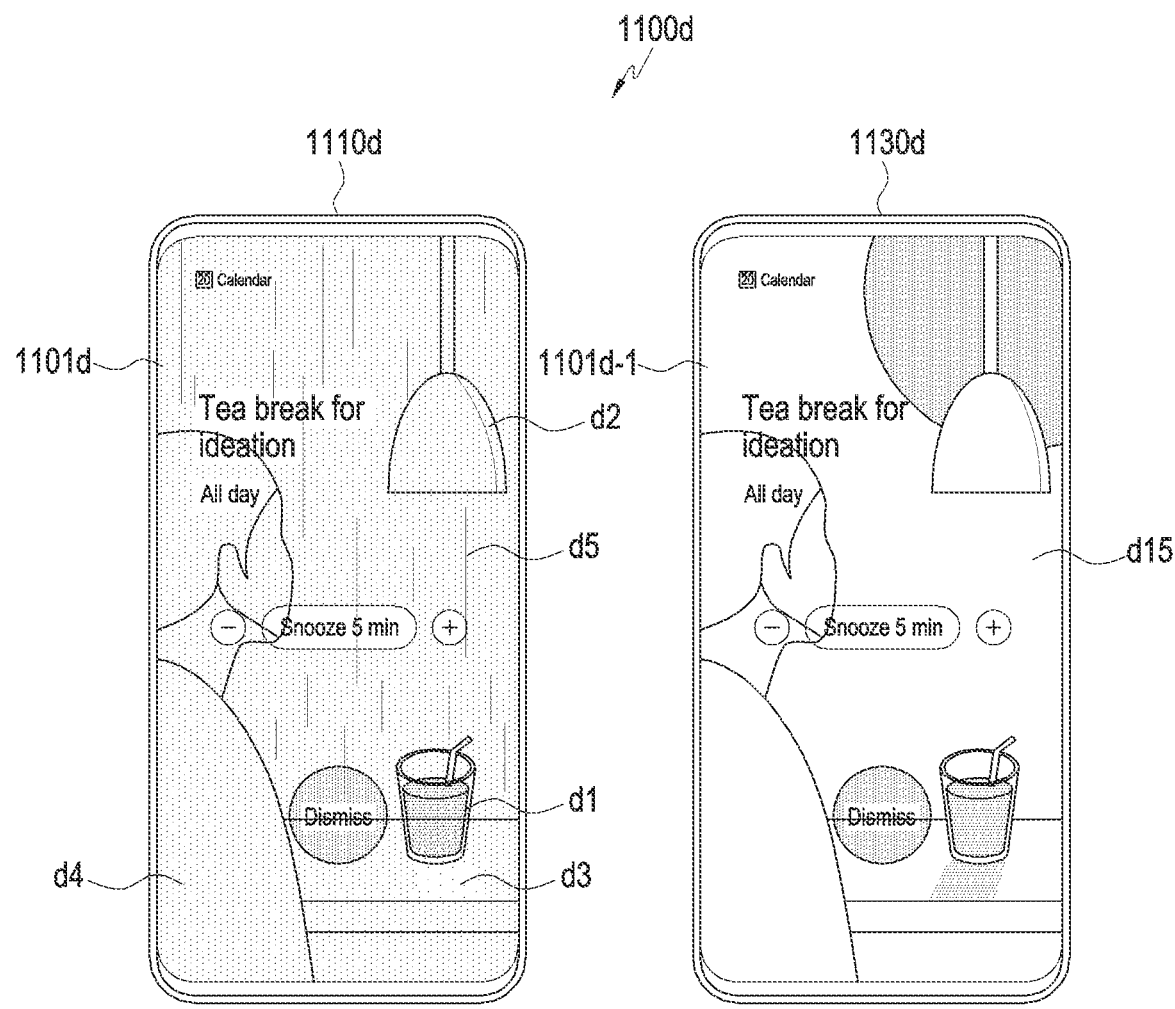

Referring to the screen 1110*d* of FIG. 11D, in a case where an image is set on a specific date, e.g., when the current time is LOAM which is the start time of the schedule information and the weather is detected as rainy according to the weather information when displaying the image set on the specific date in the calendar view for displaying detailed information on the specific date, the electronic device may display an image 1101*d* including the first object d1 to the fourth object d4 and the fifth object d5 representing the rainy background. As shown in the screen 1130*d* of FIG. 11D, e.g., when the time elapses so that the current time is 12 PM, and the weather is detected as sunny according to the weather information when displaying the image set on the specific date in the calendar view for displaying detailed information on the specific date, the electronic device may display a changed image 1101*d*-1 including another fifth object d15, representing the background corresponding to the sunny weather, into which the fifth object d5 representing the background corresponding to the rainy weather, has been changed according to a change in weather information at the time of outputting the schedule information among the image object change conditions of the first object b1 to the fifth object b5 included in the image 1101*d*.

Figure 12:
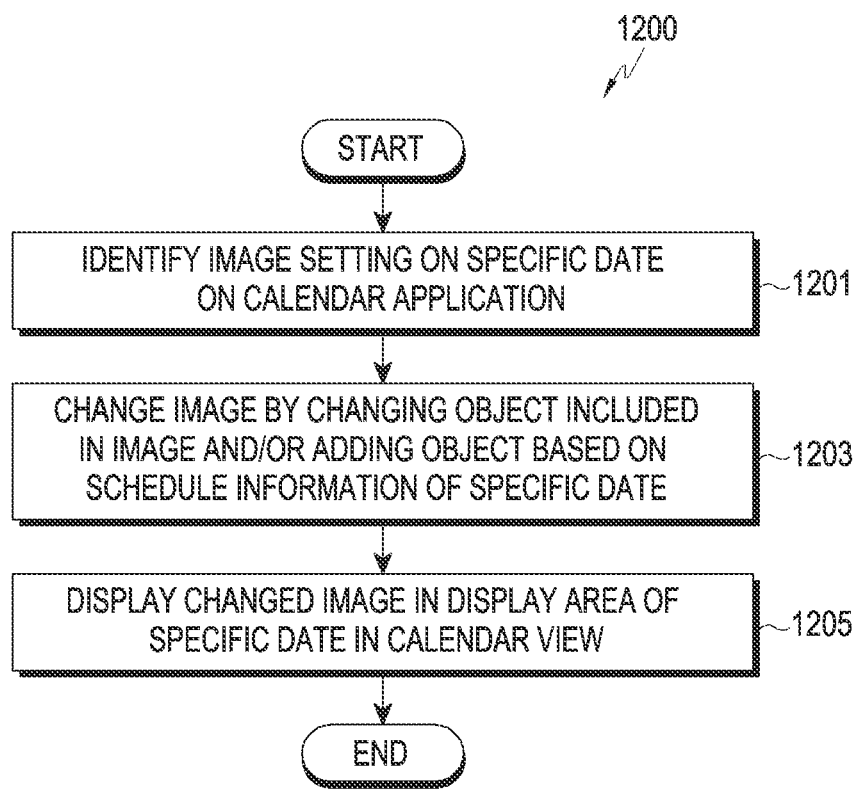
FIG. 12 is a flowchart illustrating an example operation of providing an image to a calendar application by an electronic device according to an embodiment of the disclosure.

FIG. 12 is a flowchart 1200 illustrating an example operation of providing an image to a calendar application by an electronic device according to an embodiment of the disclosure. The operations of providing an image may include operations 1201 to 1205. The operations of providing an image may be performed by an electronic device (e.g., the electronic device 101 of FIG. 1, at least one processor (e.g., the processor 120 of FIG. 1) of the electronic device, the electronic device 201 of FIG. 2, or the processor (e.g., the processor 220 of FIG. 2) of the electronic device). According to an embodiment, at least one of operations 1201 to 1205 may be omitted or changed in order or may add other operations.

Referring to FIG. 12, in operation 1201, the electronic device may identify that an image is set on a specific date on the calendar application.

In operation 1203, the electronic device may change the image by changing at least one object included in the image and/or adding an object based on the schedule information registered on the specific date.

According to an embodiment, the electronic device may add another object to at least one object included in the image or change at least one object among the at least one object included in the image into another object, based on the title, memo, and/or text information specified in the detailed information of the schedule information registered on the specific date.

In operation 1205, the electronic device may display the changed image in the display area of the specific date in the calendar view.

Figure 13A:
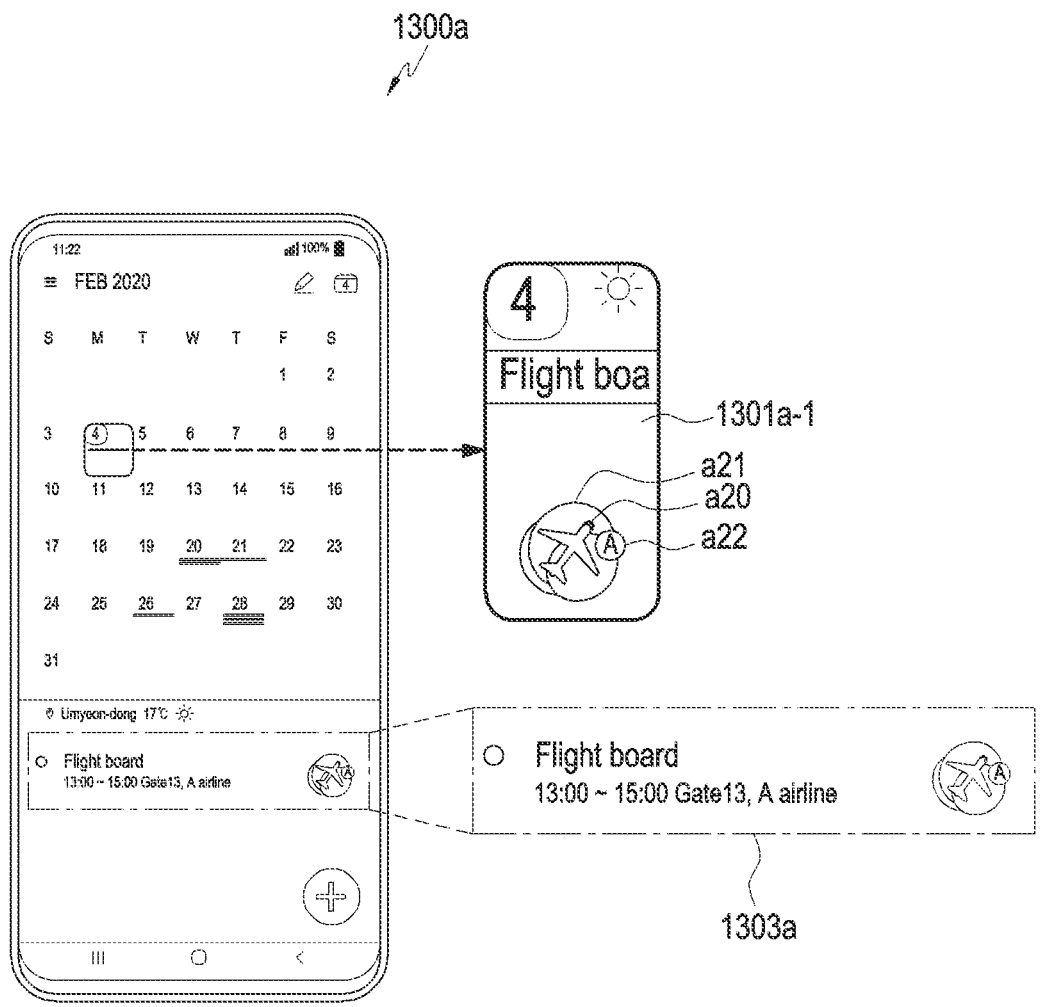
FIGS. 13A and 13B are views illustrating an operation of providing an image of a set of a plurality of images provided to a calendar application, based on schedule information, by an electronic device according to various embodiments of the disclosure.
Figure 13B:
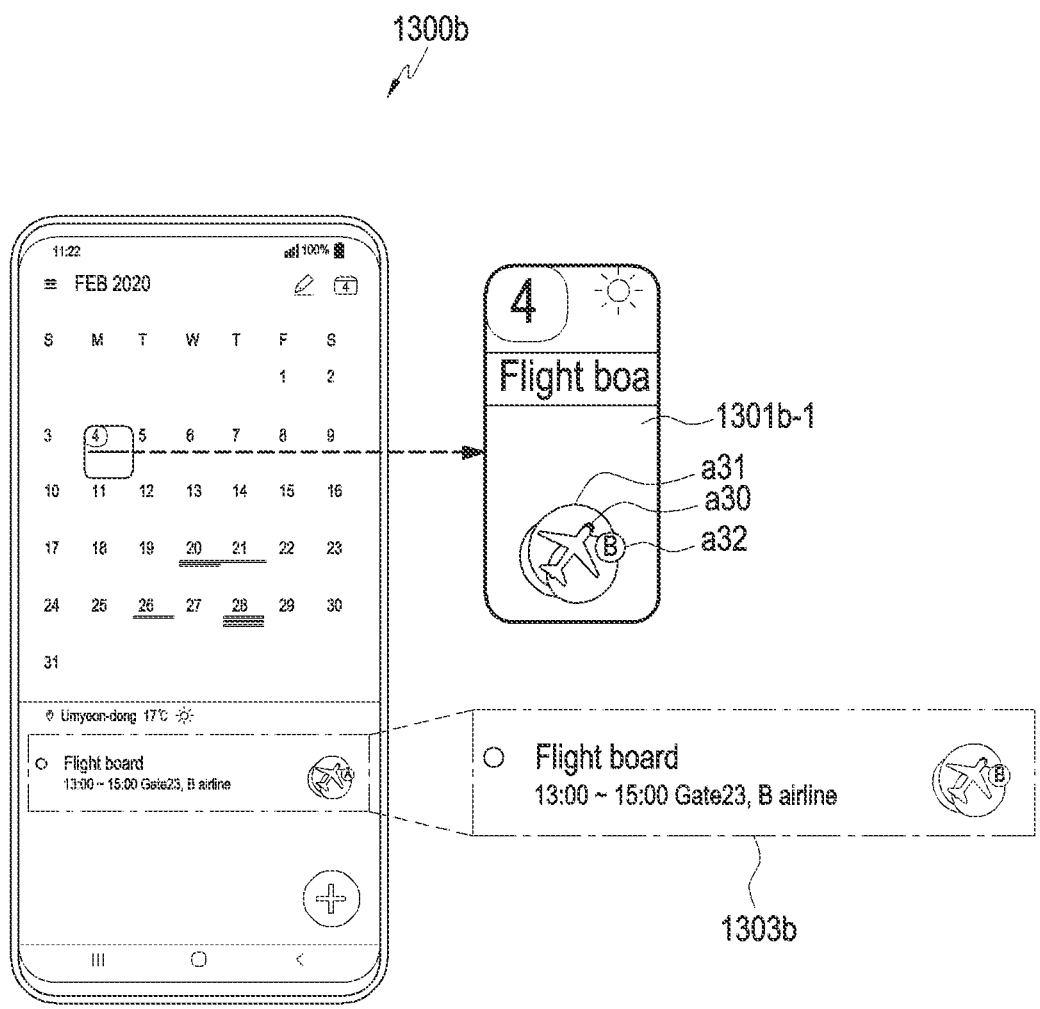

FIGS. 13A and 13B are views 1300*a* and 1300*b* illustrating an operation of providing an image of a set of a plurality of images provided to a calendar application, based on schedule information, by an electronic device according to various embodiments of the disclosure.

Referring to FIG. 13A, when the image selected by the user on the specific date (February 4) in the first calendar view for displaying in month view is set, the electronic device may analyze the content of the detailed information 1303*a* of the schedule information registered on the specific date. The electronic device may generate a changed image 1301*a*-1 which adds a third object a22 representing "A airline" to the image 1301*a* including the first object a20 and the second object a21, based on the "A airline" information in the content of the detailed information 1303*a* and display the changed image 1301*a*-1 in the display area of the specific date in the first calendar view.

Referring to FIG. 13B, when the image selected by the user on the specific date (February 4) in the first calendar view for displaying in month view is set, the electronic device may analyze the content of the detailed information 1303*b* of the schedule information registered on the specific date. The electronic device may generate a changed image 1301*b*-1 which adds a fourth object a32 representing "B airline" to the image 1301*b* including the first object a30 and the second object a31, based on the "B airline" information in the content of the detailed information 1303*b* and display the changed image 1301*b*-1 in the display area of the specific date in the first calendar view.

Figure 14:
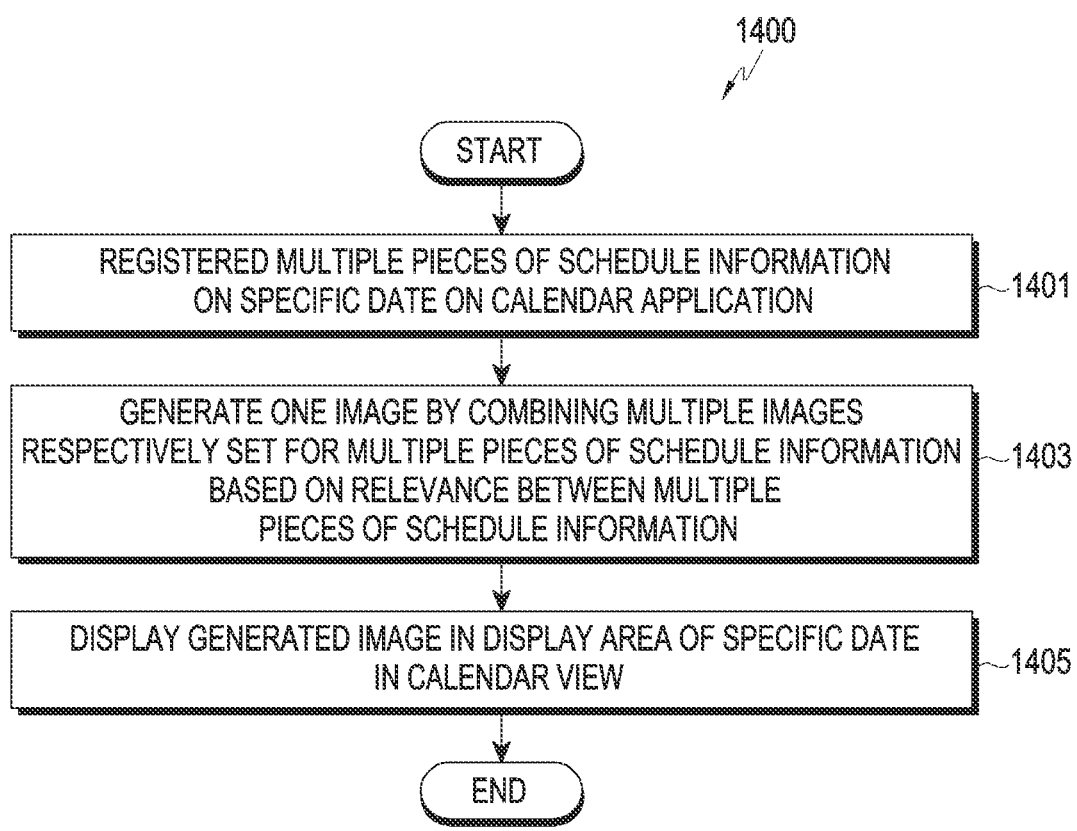
FIG. 14 is a flowchart illustrating an example operation of providing an image to a calendar application by an electronic device according to an embodiment of the disclosure.

FIG. 14 is a flowchart 1400 illustrating an example operation of providing an image to a calendar application by an electronic device according to an embodiment of the disclosure. The operations of providing an image may include operations 1401 to 1405. The operations of providing an image may be performed by an electronic device (e.g., the electronic device 101 of FIG. 1, at least one processor (e.g., the processor 120 of FIG. 1) of the electronic device, the electronic device 201 of FIG. 2, or the processor (e.g., the processor 220 of FIG. 2) of the electronic device). According to an embodiment, at least one of operations 1401 to 1405 may be omitted or changed in order or may add other operations.

Referring to FIG. 14, in operation 1401, the electronic device may identify a plurality of pieces of schedule information registered on a specific date on the calendar application.

In operation 1403, the electronic device may generate one image by combining the plurality of images set respectively for the plurality of pieces of schedule information based on the relevance between the plurality of pieces of schedule information registered on the specific date.

According to an embodiment, when a first image is registered in first schedule information registered on the specific date, and a second image is registered in second schedule information registered on the specific date, the electronic device may generate one image by combining at least one object among the at least one object included in the first image and at least one object among the at least one object included in the second image based on the relevance between the first schedule information and second schedule information.

According to an embodiment, when the first schedule information and the second schedule information are identical and/or similar in place information, time information, and at least one text included in the title/detailed description, the electronic device may determine that the first schedule information and the second schedule information are related.

In operation 1405, the electronic device may display the generated image in the display area of the specific date in the calendar view.

Figures 15A, 15B:
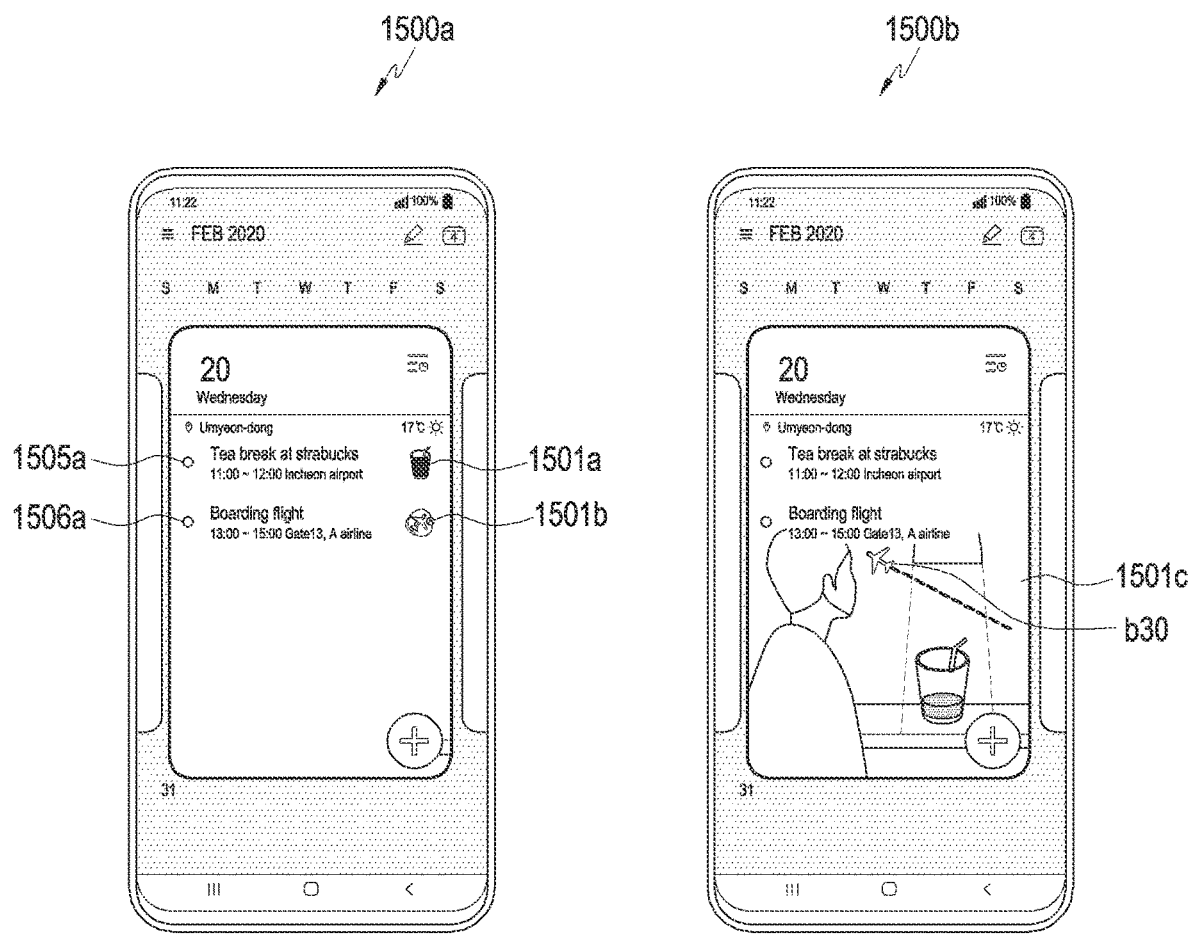
FIGS. 15A and 15B are views illustrating an operation of providing an image of a set of a plurality of images provided to a calendar application, based on schedule information, by an electronic device according to various embodiments of the disclosure.

FIGS. 15A and 15B are views 1500*a* and 1500*b* illustrating an operation of providing an image of a set of a plurality of images provided to a calendar application, based on schedule information, by an electronic device according to various embodiments of the disclosure.

Referring to FIG. 15A, in the fourth calendar view for displaying detailed information on the specific date, the electronic device may display first schedule information 1505*a* and second schedule information 1506*a* registered in the display area of the specific date (February 20) and a first image 1501*a* and a second image 1501*b* respectively set for the first schedule information 1505*a* and the second schedule information 1506*a*.

Referring to FIG. 15B, the electronic device may generate a third image 1501c obtained by combining at least one object included in the first image 1501a and one object b30 among the at least one object included in the second image 1501b, based on the relevance (e.g., same time information) between the first schedule information 1505a and the second schedule information 1506b registered on the specific date (February 20). The electronic device may display the generated image 1501c in the display area of the specific date (February 20) in the fourth calendar view for displaying detailed information on the specific date.

Figure 16:
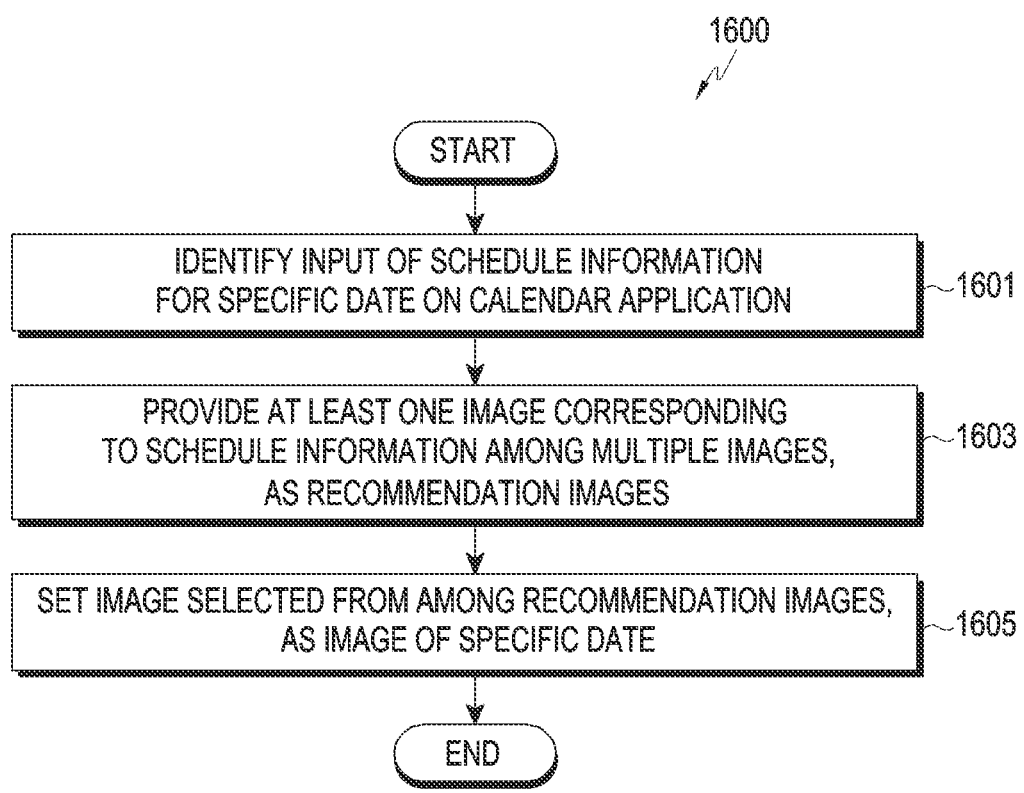
FIG. 16 is a flowchart illustrating an example operation of providing an image to a calendar application by an electronic device according to an embodiment of the disclosure.

FIG. 16 is a flowchart 1600 illustrating an example operation of providing an image to a calendar application by an electronic device according to an embodiment of the disclosure. The operations of providing an image may include operations 1601 to 1605. The operations of providing an image may be performed by an electronic device (e.g., the electronic device 101 of FIG. 1, at least one processor (e.g., the processor 120 of FIG. 1) of the electronic device, the electronic device 201 of FIG. 2, or the processor (e.g., the processor 220 of FIG. 2) of the electronic device). According to an embodiment, at least one of operations 1601 to 1605 may be omitted or changed in order or may add other operations.

Referring to FIG. 16, in operation 1601, the electronic device may identify an input of schedule information for a specific date on the calendar application.

In operation 1603, the electronic device may provide at least one image corresponding to the schedule information among a plurality of images, as a recommendation image, based on the schedule information input on the specific date.

According to an embodiment, the electronic device may provide at least one image among the plurality of images, as the recommendation image, based on at least one of the title information, time information, location information, memo information, and detailed information included in the schedule information.

In operation 1605, the electronic device may set the image selected by the user from among the recommendation images, as the image of the specific date.

According to an embodiment, the electronic device may display the image selected by the user from among the recommendation images in the display area of the specific date in the calendar view.

According to an embodiment, the electronic device may detect at least one recommendation image among the plurality of images based on the schedule information input on the specific date, and the at least one recommendation image may be determined based on at least one of the user's preference, use frequency, and previous use history.

According to an embodiment, the image selected by the user from among the recommendation images may include a set of a plurality of images including the image as the default image.

Figure 17A:
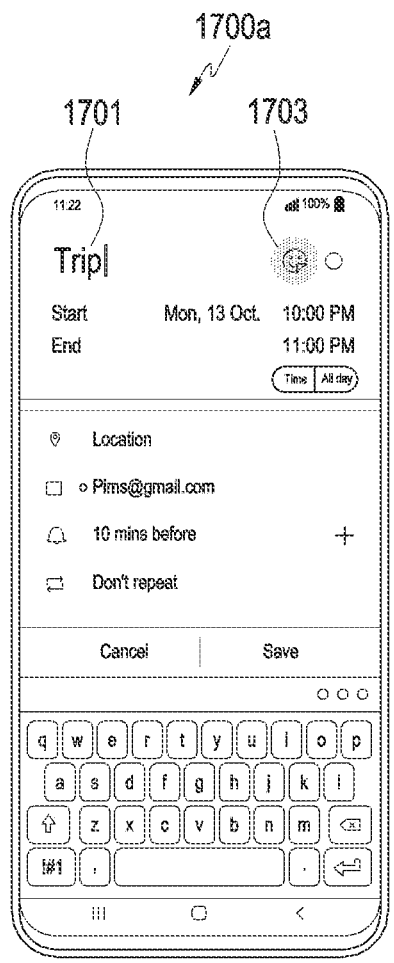
FIGS. 17A, 17B, and 17C are views illustrating an operation of setting an image provided to a calendar application by an electronic device according to various embodiments of the disclosure.
Figure 17B:
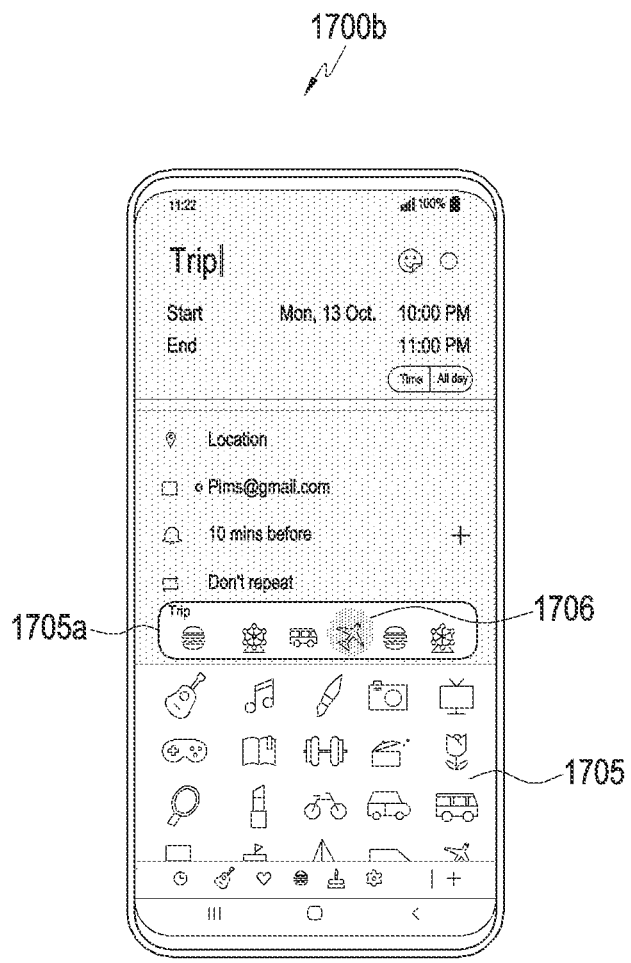
Figure 17C:
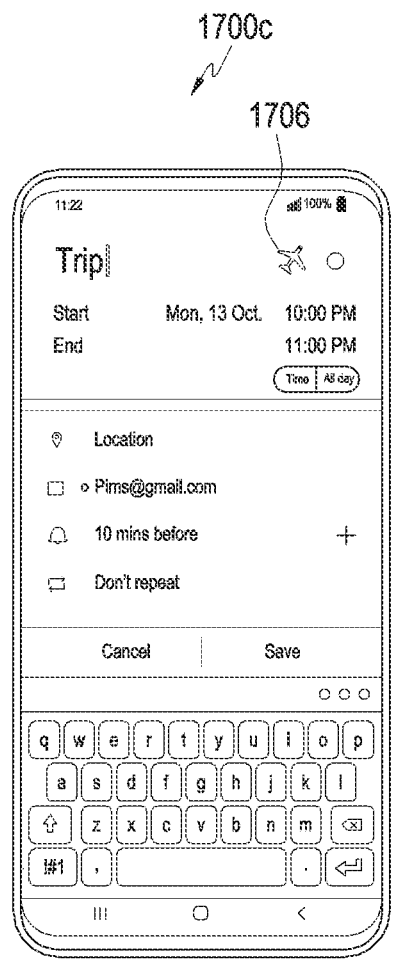

FIGS. 17A to 17C are views 1700a, 1700b, are 1700c, respectively, illustrating an operation of setting an image provided to a calendar application by an electronic device according to various embodiments of the disclosure.

Referring to FIG. 17A, if "Trip" is input to the title item 1701 in the input window for schedule information for a specific date, and the icon 1703 for selecting an image (e.g., sticker image) is selected, referring to FIG. 17B, the electronic device may display, in a popup window 1705a, at least one recommendation image corresponding to the title information ("Trip") input to the title item 1701 among the plurality of images 1705, along with the plurality of images 1705. Referring to FIG. 17C, if one image 1706 among the at least one recommendation image displayed in the popup window is selected by the user, the electronic device may display the image 1706 selected by the user, as the image set on the specific date, in the position where the icon 1703 for selecting the image (e.g., sticker image) is displayed.

Figure 18:
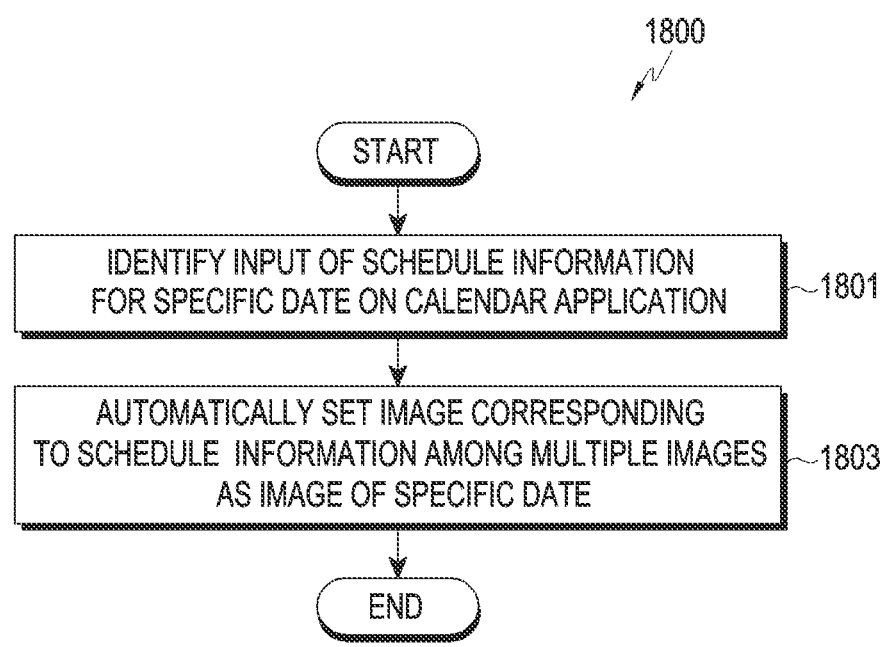
FIG. 18 is a flowchart illustrating an example operation of providing an image to a calendar application by an electronic device according to an embodiment of the disclosure.

FIG. 18 is a flowchart 1800 illustrating an example operation of providing an image to a calendar application by an electronic device according to an embodiment of the disclosure. The operations of providing an image may include operations 1801 to 1803. The operations of providing an image may be performed by an electronic device (e.g., the electronic device 101 of FIG. 1, at least one processor (e.g., the processor 120 of FIG. 1) of the electronic device, the electronic device 201 of FIG. 2, or the processor (e.g., the processor 220 of FIG. 2) of the electronic device). According to an embodiment, at least one of operations 1801 to 1803 may be omitted or changed in order or may add other operations.

Referring to FIG. 18, in operation 1801, the electronic device may identify an input of schedule information for a specific date on the calendar application.

In operation 1803, the electronic device may automatically set one image corresponding to the schedule information among the plurality of images, as the image set on the specific date, based on the schedule information input on the specific date.

According to an embodiment, the electronic device may automatically set one image among the plurality of images as the image of the specific date based on at least one of the title information, time information, location information, memo information, and detailed information included in the schedule information.

According to an embodiment, the electronic device may detect at least one candidate image among the plurality of images based on the schedule information input on the specific date and automatically set one image as the image of the specific date among the candidate images based on the user's preference, use frequency, and previous use history.

According to an embodiment, the image automatically set as the image of the specific date may include a set of a plurality of images including the image as the default image.

Figure 19A:
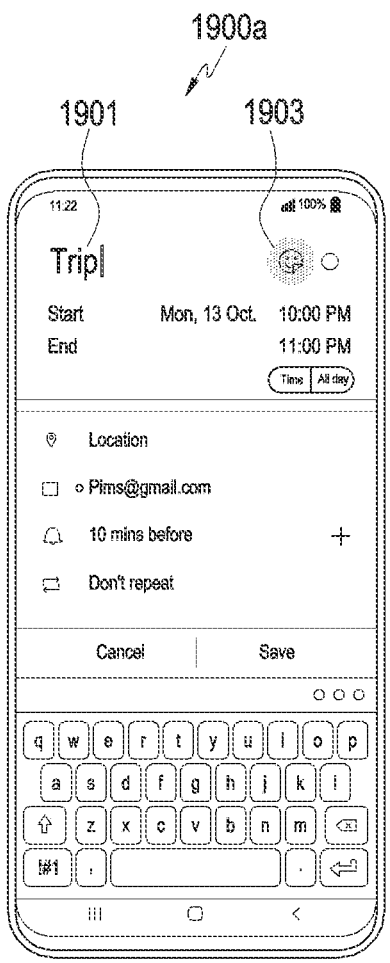
FIGS. 19A and 19B are views illustrating an operation of setting an image provided to a calendar application by an electronic device according to various embodiments of the disclosure.
Figure 19B:
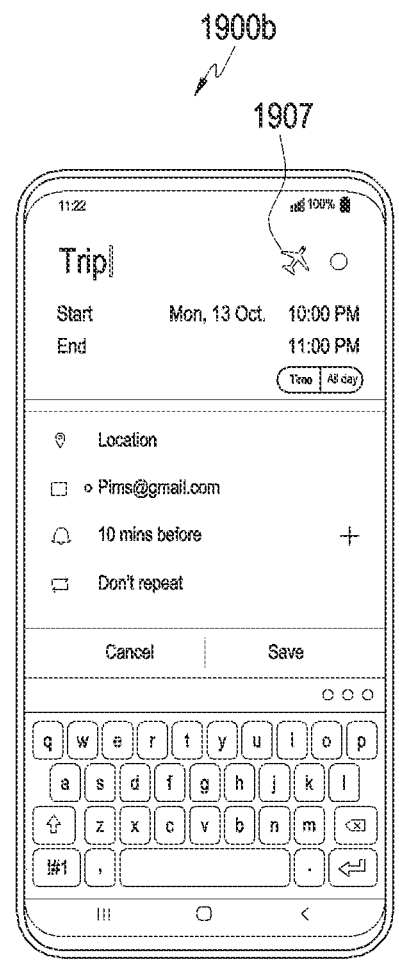

FIGS. 19A and 19B are views 1900a and 1900b illustrating an operation of setting an image provided to a calendar application by an electronic device according to various embodiments of the disclosure.

If "Trip" is input to the title item 1901 in the input window of schedule information for a specific date, and the icon 1903 for selecting an image (e.g., sticker image) is selected as shown in FIG. 19A, the electronic device may determine one image 1907 corresponding to the title information ("Trip") input to the title item 1901 among the plurality of images and display, as the image set on the specific date, the automatically set image 1907 instead of the icon 1903, in the position where the icon 1903 for selecting the image (e.g., sticker image) is displayed.

Figure 20:
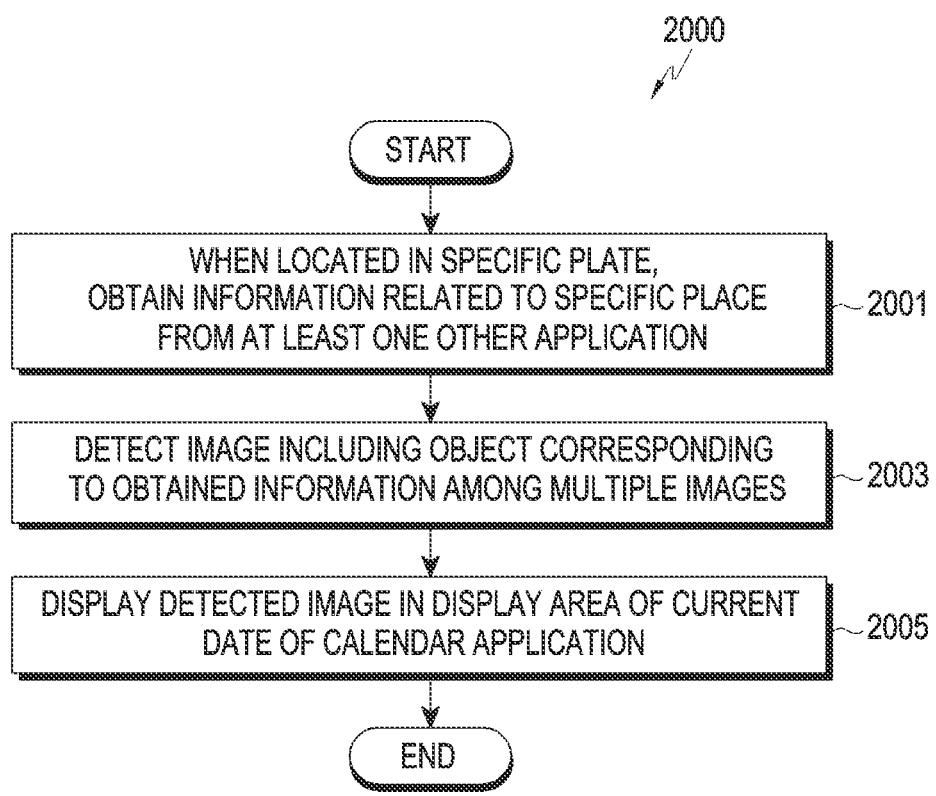
FIG. 20 is a flowchart illustrating an example operation of providing an image to a calendar application by an electronic device according to an embodiment of the disclosure.

FIG. 20 is a flowchart 2000 illustrating an example operation of providing an image to a calendar application by an electronic device according to an embodiment of the disclosure. The operations of providing an image may include operations 2001 to 2005. The operations of providing an image may be performed by an electronic device (e.g., the electronic device 101 of FIG. 1, at least one processor (e.g., the processor 120 of FIG. 1) of the electronic device, the electronic device 201 of FIG. 2, or the processor (e.g., the processor 220 of FIG. 2) of the electronic device).

According to an embodiment, at least one of operations 2001 to 2005 may be omitted or changed in order or may add other operations.

In operation 2001, when the electronic device is located in a specific plate, information related to the specific place may be obtained from at least one other application.

In operation 2003, the electronic device may detect an image including the object corresponding to the obtained information among the plurality of images.

In operation 2005, the electronic device may set the detected image as the image of the current date and display it in the display area of the current date in the calendar view of the calendar application.

According to an embodiment, when no image is set on the current date, the detected image may be set as the image of the current date and be displayed in the display area of the current date.

According to an embodiment, when an image is set on the current date, an image changed by adding an object corresponding to the obtained information to the image may be set as the image of the current date and be displayed in the display area of the current date.

Figure 21:
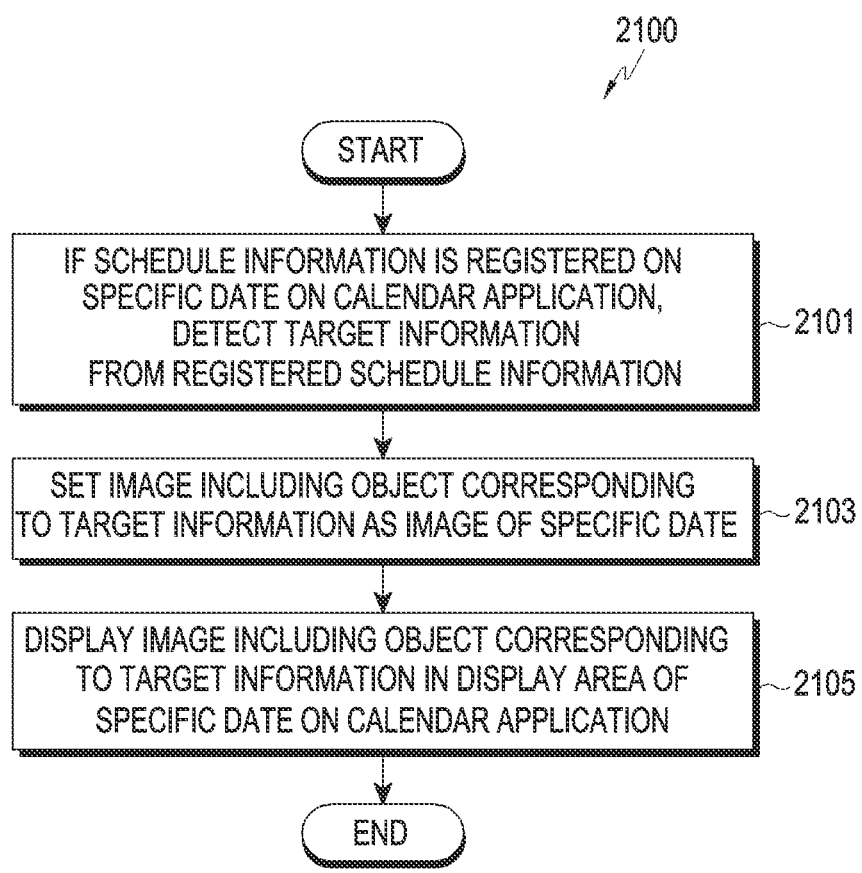
FIG. 21 is a flowchart illustrating an example operation of providing an image to a calendar application by an electronic device according to an embodiment of the disclosure.

FIG. 21 is a flowchart 2100 illustrating an example operation of providing an image to a calendar application by an electronic device according to an embodiment of the disclosure. The operations of providing an image may include operations 2101 to 2105. The operations of providing an image may be performed by an electronic device (e.g., the electronic device 101 of FIG. 1, at least one processor (e.g., the processor 120 of FIG. 1) of the electronic device, the electronic device 201 of FIG. 2, or the processor (e.g., the processor 220 of FIG. 2) of the electronic device). According to an embodiment, at least one of operations 2101 to 2105 may be omitted or changed in order or may add other operations.

In operation 2101, if schedule information is registered on a specific date on the calendar application, the electronic device may detect target information in the registered schedule information.

According to an embodiment, the electronic device may detect target information, such as name information, thing information, or place information, based on the title information, memo information, and text information input to at least one of the detailed information, of the schedule information registered on the specific date.

In operation 2103, the electronic device may set the image including the object corresponding to the target information as the image of the specific date.

According to an embodiment, if name information is detected as the target information, the electronic device may obtain an image (e.g., AR emoji or photo image) corresponding to the name information from an application (e.g., gallery application) other than the calendar application and set it as the image of the specific date.

According to an embodiment, if thing information and/or place information is detected as the target information, the electronic device may obtain an image corresponding to the thing information and/or place information from the application (e.g., Internet application) other than the calendar application and set it as the image of the specific date.

In operation 2105, the electronic device may display an image including the object corresponding to the target information in the display area of the specific date in the calendar view of the calendar application.

According to various embodiments, a method for providing an image on a calendar application by an electronic device (e.g., the electronic device 101 of FIG. 1 and/or the electronic device 201 of FIG. 2) may comprise, if an image is set on a specific date on the calendar application, identifying a set of a plurality of images including the image as a default image and determining a first image among the set of the plurality of images based on a calendar view selected from the calendar application and displaying the determined first image in a display area of the specific date in the calendar view.

According to various embodiments, the first image among the set of the plurality of images may be determined based on a size of the display area of the specific date in the calendar view.

According to various embodiments, the first image among the set of the plurality of images may be determined based on display information about schedule information to be displayed in the display area of the specific date in the calendar view.

According to various embodiments, the method may further comprise, if the image is set on a plurality of dates on the calendar application, determining the first image among the set of the plurality of images based on a size of a plurality of display areas corresponding to the plurality of dates and displaying the determined image, as one image, in the plurality of areas.

According to various embodiments, the method may further comprise changing a position and/or size of the first image based on an image display change condition and displaying the first image in the display area of the specific date.

According to various embodiments, the image display change condition may include at least one of whether schedule information is registered, a number of pieces of registered schedule information, and/or a length of schedule information.

According to various embodiments, the method may further comprise changing at least one object among at least one object included in the first image into another object based on an image object change condition and displaying the first image in the area of the specific date.

According to various embodiments, the image object change condition may include at least one of a time change in schedule information and/or an environment change at a time of notifying of schedule information.

According to various embodiments, the method may further comprise changing at least one object or adding an object to the first image, based on schedule information registered on the specific date.

According to various embodiments, the method may further comprise, if a plurality of pieces of schedule information are registered on the specific date, displaying, in the area of the specific date, one image obtained by combining a plurality of images respectively set for the plurality of pieces of schedule information, based on a relevance between the plurality of pieces of schedule information.

According to various embodiments, the method may further comprise determining at least one image among a plurality of images based on schedule information on the specific date on the calendar application and providing the at least one determined image as a recommendation image.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, there may be provided a storage medium storing instructions that are configured to, when executed by at least one processor, enable the at least one processor to perform at least one operation comprising, if an image is set on a specific date on the calendar application, identifying a set of a plurality of images including the image as a default image and determining a first image among the set of the plurality of images based on a calendar view selected from the calendar application and displaying the determined first image in a display area of the specific date in the calendar view.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a display;
   memory storing one or more computer programs; and
   at least one processor communicatively coupled to the display and the memory,
   wherein the one or more computer programs include computer-executable instructions that, when executed by the at least one processor individually or collectively, cause the electronic device to:
   in response to an image being set on a specific date on a calendar application, identify a set of a plurality of images including the image, and identifying the image as a default image,
   determine a first image among the set of the plurality of images based on a calendar view selected from the calendar application, and
   display the determined first image in a display area of the specific date in the calendar view,
   wherein each image in the set contains a different number of objects and each image in the set contains a same first object.

2. The electronic device of claim 1, wherein the one or more computer programs further include computer-executable instructions that, when executed by the at least one processor individually or collectively, cause the electronic device to determine the first image among the set of the plurality of images, based on a size of the display area of the specific date in the calendar view.

3. The electronic device of claim 1, wherein the one or more computer programs further include computer-executable instructions that, when executed by the at least one processor individually or collectively, cause the electronic device to:
determine the first image among the set of the plurality of images based on display information about schedule information to be displayed in the display area of the specific date in the calendar view.

4. The electronic device of claim 1,
wherein the one or more computer programs further include computer-executable instructions that, when executed by the at least one processor individually or collectively, cause the electronic device to:
change a position and/or size of the first image based on an image display change condition, and
display the first image in the display area of the specific date, and
wherein the image display change condition includes at least one of whether schedule information is registered, a number of pieces of registered schedule information, and/or a length of schedule information.

5. The electronic device of claim 1,
wherein the one or more computer programs further include computer-executable instructions that, when executed by the at least one processor individually or collectively, cause the electronic device to:
modify the first image by changing at least one object among at least one object included in the first image into another object based on an image object change condition, and
display the modified first image in the display area of the specific date, and
wherein the image object change condition includes at least one of a time change in schedule information and/or an environment change at a time of notifying of schedule information.

6. The electronic device of claim 1, wherein the one or more computer programs further include computer-executable instructions that, when executed by the at least one processor individually or collectively, cause the electronic device to change at least one object or add an object to the first image, based on schedule information registered on the specific date.

7. The electronic device of claim 1, wherein one or more computer programs further include computer-executable instructions that, when executed by the at least one processor individually or collectively, cause the electronic device to, if a plurality of pieces of schedule information are registered on the specific date, display, in the display area of the specific date, one image obtained by combining a plurality of images respectively set for the plurality of pieces of schedule information, based on a relevance between the plurality of pieces of schedule information.

8. The electronic device of claim 1, wherein the one or more computer programs further include computer-executable instructions that, when executed by the at least one processor individually or collectively, cause the electronic device to:
determine at least one image among a plurality of images based on schedule information on the specific date on the calendar application, and
provide the at least one determined image as a recommendation image.

9. A method for providing an image on a calendar application by an electronic device, the method comprising:
in response to an image being set on a specific date on the calendar application, identifying a set of a plurality of images including the image, and identifying the image as a default image;
determining a first image of the set among the plurality of images based on a calendar view selected from the calendar application; and
displaying the determined first image in a display area of the specific date in the calendar view,
wherein each image in the set contains a different number of objects and each image in the set contains a same first object.

10. The method of claim 9, wherein the first image among the set of the plurality of images is determined based on a size of the display area of the specific date in the calendar view.

11. The method of claim 9, wherein the first image among the set of the plurality of images is determined based on display information about schedule information to be displayed in the display area of the specific date in the calendar view.

12. The method of claim 9, further comprising:
changing a position and/or size of the first image based on an image display change condition; and
displaying the first image in the display area of the specific date,
wherein the image display change condition includes at least one of whether schedule information is registered, a number of pieces of registered schedule information, and/or a length of schedule information.

13. The method of claim 9, further comprising:
changing at least one object among at least one object included in the first image into another object based on an image object change condition; and
displaying the first image in the display area of the specific date,
wherein the image object change condition includes at least one of a time change in schedule information and/or an environment change at a time of notifying of schedule information.

14. The method of claim 9, further comprising:
if a plurality of pieces of schedule information are registered on the specific date, displaying, in the display area of the specific date, one image obtained by combining a plurality of images respectively set for the plurality of pieces of schedule information, based on a relevance between the plurality of pieces of schedule information.

15. The method of claim 9, further comprising:
determining at least one image among a plurality of images based on schedule information on the specific date on the calendar application; and
providing the at least one determined image as a recommendation image.

* * * * *